(12) United States Patent
Wang et al.

(10) Patent No.: US 11,889,322 B2
(45) Date of Patent: Jan. 30, 2024

(54) USER-EQUIPMENT COORDINATION SET BEAM SWEEPING

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 319 days.

(21) Appl. No.: 17/433,197

(22) PCT Filed: Mar. 12, 2020

(86) PCT No.: PCT/US2020/022460
§ 371 (c)(1),
(2) Date: Aug. 23, 2021

(87) PCT Pub. No.: WO2020/186097
PCT Pub. Date: Sep. 17, 2020

(65) Prior Publication Data
US 2022/0141676 A1 May 5, 2022

Related U.S. Application Data

(60) Provisional application No. 62/817,079, filed on Mar. 12, 2019.

(51) Int. Cl.
*H04W 16/28* (2009.01)
*H04B 7/026* (2017.01)
(Continued)

(52) U.S. Cl.
CPC ............ *H04W 16/28* (2013.01); *H04B 7/026* (2013.01); *H04B 7/0617* (2013.01); *H04W 72/02* (2013.01); *H04W 72/0446* (2013.01)

(58) Field of Classification Search
CPC ..... H04B 7/026; H04B 7/0617; H04W 16/28; H04W 72/02; H04W 72/0446
See application file for complete search history.

(56) References Cited

U.S. PATENT DOCUMENTS 6,038,448 A  3/2000 Chheda et al.
6,665,521 B1  12/2003 Gorday et al.
(Continued)

FOREIGN PATENT DOCUMENTS

CN  101764634  6/2010
CN  101867451  10/2010
(Continued)

OTHER PUBLICATIONS

"Foreign Office Action", TW Application No. 20209124827, 13 pages.
(Continued)

*Primary Examiner* — Khoa Huynh
(74) *Attorney, Agent, or Firm* — Colby Nipper PLLC

(57) ABSTRACT

This document describes techniques and apparatuses for user-equipment coordination set (UECS) beam sweeping. In aspects, a user equipment (UE) receives an indication to coordinate beam sweeping with a UECS. The UE directs each UE in the UECS to perform a beam-training procedure by receiving a set of downlink beam transmissions, and forwards beam report information to a base station. In implementations, the UE receives an indication of one or more beam identities and one or more assigned time slots, and directs at least two UEs in the UECS to use specific beams indicated by the beam identities at specific time slots indicated by the assigned time slots, such as by transmitting a respective beam identity and a respective time slot to each UE of the at least two UEs.

20 Claims, 8 Drawing Sheets

(51) Int. Cl.
*H04B 7/06* (2006.01)
*H04W 72/02* (2009.01)
*H04W 72/0446* (2023.01)

(56) References Cited

U.S. PATENT DOCUMENTS

| | | |
|---|---|---|
| 6,898,430 B1 | 5/2005 | Liberti et al. |
| 8,023,463 B2 | 9/2011 | Dick et al. |
| 8,315,629 B2 | 11/2012 | Pamp et al. |
| 8,483,184 B2 | 7/2013 | Yokoyama et al. |
| 8,559,992 B2 | 10/2013 | Larsson et al. |
| 8,665,806 B2 | 3/2014 | Wang et al. |
| 8,706,156 B2 | 4/2014 | Han et al. |
| 9,008,678 B2 | 4/2015 | Schoenerstedt |
| 9,036,613 B2 | 5/2015 | Bleugels et al. |
| 9,100,095 B2 | 8/2015 | Mantri |
| 9,210,550 B2 | 12/2015 | Koc et al. |
| 9,253,783 B2 | 2/2016 | Wang et al. |
| 9,271,194 B2 | 2/2016 | Lu et al. |
| 9,344,159 B2 | 5/2016 | Zhuang |
| 9,374,772 B2 | 6/2016 | Daoud |
| 9,380,533 B2 | 6/2016 | Chung et al. |
| 9,674,863 B2 | 6/2017 | Cheng et al. |
| 9,699,731 B2 | 7/2017 | Khoryaev et al. |
| 9,743,329 B2 | 8/2017 | Xiao et al. |
| 9,780,842 B2 | 10/2017 | Boudreau et al. |
| 9,941,939 B2 | 4/2018 | Parl et al. |
| 9,985,750 B2 | 5/2018 | Maaref et al. |
| 10,045,376 B2 | 8/2018 | Yang et al. |
| 10,178,696 B2 | 1/2019 | Cheng et al. |
| 10,201,003 B2 | 2/2019 | Guo et al. |
| 10,218,422 B2 | 2/2019 | Raghavan et al. |
| 10,313,950 B2 | 6/2019 | Choi et al. |
| 10,321,414 B2 | 6/2019 | Guo et al. |
| 10,412,691 B1 | 9/2019 | Marupaduga et al. |
| 10,542,556 B2 | 1/2020 | Mallik |
| 10,834,645 B2 | 11/2020 | Wang et al. |
| 10,893,572 B2 | 1/2021 | Wang et al. |
| 11,134,092 B2 | 9/2021 | Michael et al. |
| 11,641,566 B2 | 5/2023 | Wang et al. |
| 2003/0002460 A1 | 1/2003 | English |
| 2004/0203973 A1 | 10/2004 | Khan |
| 2004/0233858 A1 | 11/2004 | Karaoguz |
| 2006/0116156 A1 | 6/2006 | Haseba et al. |
| 2006/0128312 A1 | 6/2006 | Declerck et al. |
| 2006/0203731 A1 | 9/2006 | Tiedemann et al. |
| 2009/0175214 A1* | 7/2009 | Sfar .............. H04J 11/0053 370/315 |
| 2009/0176494 A1 | 7/2009 | Lee et al. |
| 2010/0027487 A1 | 2/2010 | Ihm et al. |
| 2010/0103983 A1 | 4/2010 | Wang et al. |
| 2010/0118752 A1 | 5/2010 | Suzuki et al. |
| 2010/0142462 A1 | 6/2010 | Wang et al. |
| 2010/0173660 A1 | 7/2010 | Liu et al. |
| 2010/0210246 A1 | 8/2010 | Yang et al. |
| 2011/0080893 A1 | 4/2011 | Fong et al. |
| 2011/0096751 A1 | 4/2011 | Ma et al. |
| 2011/0124294 A1 | 5/2011 | Dwyer et al. |
| 2011/0158117 A1 | 6/2011 | Ho et al. |
| 2011/0281585 A1 | 11/2011 | Kwon et al. |
| 2012/0087273 A1 | 4/2012 | Koo et al. |
| 2012/0120821 A1 | 5/2012 | Kazmi et al. |
| 2012/0157139 A1 | 6/2012 | Noh et al. |
| 2012/0178462 A1 | 7/2012 | Kim |
| 2012/0218968 A1 | 8/2012 | Kim et al. |
| 2012/0264443 A1 | 10/2012 | Ng et al. |
| 2013/0034136 A1 | 2/2013 | Park et al. |
| 2013/0039287 A1 | 2/2013 | Rayavarapu et al. |
| 2013/0053045 A1 | 2/2013 | Chuang |
| 2013/0053079 A1 | 2/2013 | Kwun et al. |
| 2013/0089058 A1 | 4/2013 | Yang et al. |
| 2013/0107848 A1 | 5/2013 | Kang et al. |
| 2013/0122918 A1 | 5/2013 | Boley et al. |
| 2013/0130684 A1 | 5/2013 | Gomes et al. |
| 2013/0138817 A1 | 5/2013 | Zhang et al. |
| 2013/0150106 A1 | 6/2013 | Bucknell et al. |
| 2013/0182628 A1 | 7/2013 | Gholmieh et al. |
| 2013/0225184 A1 | 8/2013 | Liu et al. |
| 2013/0242787 A1 | 9/2013 | Sun et al. |
| 2013/0244682 A1 | 9/2013 | Schoenerstedt |
| 2014/0010131 A1 | 1/2014 | Gaal et al. |
| 2014/0112184 A1 | 4/2014 | Chai |
| 2014/0127991 A1 | 5/2014 | Lim et al. |
| 2014/0148168 A1 | 5/2014 | Aoyagi et al. |
| 2014/0169201 A1 | 6/2014 | Tamura et al. |
| 2014/0169261 A1 | 6/2014 | Ming et al. |
| 2014/0177456 A1 | 6/2014 | Boudreau et al. |
| 2014/0226575 A1 | 8/2014 | Davydov et al. |
| 2014/0269632 A1 | 9/2014 | Blankenship et al. |
| 2014/0274081 A1 | 9/2014 | Comeau et al. |
| 2014/0321433 A1 | 10/2014 | Xiao et al. |
| 2014/0348104 A1 | 11/2014 | Morita |
| 2014/0376478 A1 | 12/2014 | Morita |
| 2015/0038083 A1 | 2/2015 | Patro et al. |
| 2015/0043390 A1 | 2/2015 | Wang et al. |
| 2015/0065148 A1 | 3/2015 | De Pasquale et al. |
| 2015/0098397 A1 | 4/2015 | Damnjanovic et al. |
| 2015/0139197 A1 | 5/2015 | He et al. |
| 2015/0139203 A1 | 5/2015 | Miryala et al. |
| 2015/0163822 A1 | 6/2015 | Guo et al. |
| 2015/0195795 A1 | 7/2015 | Loehr et al. |
| 2015/0244489 A1 | 8/2015 | Wang |
| 2015/0288427 A1 | 10/2015 | Wang et al. |
| 2015/0326282 A1 | 11/2015 | Futaki |
| 2015/0358860 A1 | 12/2015 | Lu et al. |
| 2015/0373730 A1 | 12/2015 | Fujishiro et al. |
| 2015/0382142 A1 | 12/2015 | Kim et al. |
| 2016/0007138 A1 | 1/2016 | Palanisamy et al. |
| 2016/0021526 A1 | 1/2016 | Niu et al. |
| 2016/0021623 A1 | 1/2016 | Guo et al. |
| 2016/0028448 A1 | 1/2016 | Park et al. |
| 2016/0044634 A1 | 2/2016 | Seo et al. |
| 2016/0057604 A1 | 2/2016 | Luo et al. |
| 2016/0057663 A1 | 2/2016 | Teyeb et al. |
| 2016/0088642 A1 | 3/2016 | Yang et al. |
| 2016/0128123 A1 | 5/2016 | Li |
| 2016/0174278 A1 | 6/2016 | Gao et al. |
| 2016/0192420 A1 | 6/2016 | Kim et al. |
| 2016/0192433 A1 | 6/2016 | Deenoo et al. |
| 2016/0227463 A1 | 8/2016 | Baligh et al. |
| 2016/0323832 A1 | 11/2016 | Love et al. |
| 2016/0374026 A1 | 12/2016 | Dinan |
| 2017/0070931 A1 | 3/2017 | Huang et al. |
| 2017/0078333 A1 | 3/2017 | Tevlin |
| 2017/0086061 A1 | 3/2017 | Huang et al. |
| 2017/0105147 A1 | 4/2017 | Jiang et al. |
| 2017/0164252 A1 | 6/2017 | Chaudhuri et al. |
| 2017/0188206 A1 | 6/2017 | Schmitt et al. |
| 2017/0188406 A1 | 6/2017 | Baligh et al. |
| 2017/0230986 A1 | 8/2017 | Moon et al. |
| 2017/0250786 A1 | 8/2017 | Better et al. |
| 2017/0248173 A1 | 9/2017 | Yang |
| 2017/0290030 A1 | 10/2017 | Wang et al. |
| 2017/0332389 A1 | 11/2017 | Sun et al. |
| 2017/0339530 A1 | 11/2017 | Maaref |
| 2017/0359759 A1 | 12/2017 | Brown et al. |
| 2018/0013533 A1 | 1/2018 | Yang et al. |
| 2018/0027393 A1 | 1/2018 | Yang et al. |
| 2018/0062770 A1 | 3/2018 | Reial et al. |
| 2018/0146471 A1 | 5/2018 | Xu et al. |
| 2018/0152949 A1 | 5/2018 | Guo et al. |
| 2018/0152951 A1 | 5/2018 | Zhuang et al. |
| 2018/0213450 A1 | 7/2018 | Futaki et al. |
| 2018/0220403 A1 | 8/2018 | Wilson et al. |
| 2018/0235020 A1 | 8/2018 | Maaref |
| 2018/0352511 A1 | 12/2018 | Martin et al. |
| 2019/0007844 A1 | 1/2019 | Müller et al. |
| 2019/0028348 A1 | 1/2019 | Chai |
| 2019/0053235 A1 | 2/2019 | Novlan et al. |
| 2019/0075581 A1 | 3/2019 | Salem et al. |
| 2019/0075604 A1 | 3/2019 | Wang et al. |
| 2019/0081657 A1 | 3/2019 | Zeng et al. |
| 2019/0082331 A1 | 3/2019 | Raghavan et al. |
| 2019/0082371 A1 | 3/2019 | Burt et al. |

(56) References Cited

U.S. PATENT DOCUMENTS

| | | | |
|---|---|---|---|
| 2019/0082428 A1 | 3/2019 | Maaref et al. | |
| 2019/0110318 A1 | 4/2019 | Zhang et al. | |
| 2019/0132882 A1 | 5/2019 | Li et al. | |
| 2019/0165843 A1 | 5/2019 | Wu et al. | |
| 2019/0174346 A1 | 6/2019 | Murray et al. | |
| 2019/0174472 A1 | 6/2019 | Lee et al. | |
| 2019/0215048 A1 | 7/2019 | Cirik et al. | |
| 2019/0253106 A1 | 8/2019 | Raghavan et al. | |
| 2019/0312616 A1* | 10/2019 | Christoffersson | H04B 7/0456 |
| 2019/0363843 A1 | 11/2019 | Gordaychik | |
| 2020/0015192 A1 | 1/2020 | Chun | |
| 2020/0022043 A1 | 1/2020 | Pelletier et al. | |
| 2020/0022174 A1 | 1/2020 | Karaki et al. | |
| 2020/0037119 A1 | 1/2020 | Yang | |
| 2020/0092685 A1 | 3/2020 | Fehrenbach et al. | |
| 2020/0137591 A1* | 4/2020 | Smith | H04B 7/0695 |
| 2020/0154442 A1 | 5/2020 | Zhou | |
| 2020/0178131 A1 | 6/2020 | Wang et al. | |
| 2020/0187281 A1 | 6/2020 | Wang et al. | |
| 2020/0322962 A1 | 10/2020 | Wang et al. | |
| 2020/0329503 A1 | 10/2020 | Da Silva et al. | |
| 2020/0374970 A1 | 11/2020 | Wang et al. | |
| 2020/0396763 A1 | 12/2020 | Lee et al. | |
| 2021/0028978 A1 | 1/2021 | Zhou et al. | |
| 2021/0029516 A1 | 1/2021 | Wang et al. | |
| 2021/0054964 A1 | 3/2021 | Wang et al. | |
| 2021/0160850 A1 | 5/2021 | Akkarakaran et al. | |
| 2021/0385903 A1 | 12/2021 | Wang et al. | |
| 2022/0006493 A1 | 1/2022 | Wang et al. | |
| 2022/0052745 A1 | 2/2022 | Li | |
| 2022/0086653 A1 | 3/2022 | Wang et al. | |
| 2022/0191967 A1 | 6/2022 | Wang et al. | |

FOREIGN PATENT DOCUMENTS

| | | |
|---|---|---|
| CN | 102595429 | 7/2012 |
| CN | 102638297 | 8/2012 |
| CN | 103313197 | 9/2013 |
| CN | 104429142 | 3/2015 |
| CN | 104756425 | 7/2015 |
| CN | 104885391 | 9/2015 |
| CN | 107135490 | 9/2017 |
| CN | 107211271 | 9/2017 |
| CN | 107872889 | 4/2018 |
| CN | 109246708 | 1/2019 |
| EP | 2809104 | 12/2014 |
| EP | 2953393 | 12/2015 |
| EP | 3282786 | 2/2018 |
| EP | 3425936 | 1/2019 |
| KR | 20080089457 | 10/2008 |
| KR | 20090118058 | 11/2009 |
| WO | 0237771 | 5/2002 |
| WO | 2008147654 | 12/2008 |
| WO | 2011140715 | 11/2011 |
| WO | 2012114151 | 8/2012 |
| WO | 2013057047 | 4/2013 |
| WO | 2013091229 | 6/2013 |
| WO | 2014074919 | 5/2014 |
| WO | 2014165086 | 10/2014 |
| WO | 2014179958 | 11/2014 |
| WO | 2015074270 | 5/2015 |
| WO | 2015163798 | 10/2015 |
| WO | 2016081375 | 5/2016 |
| WO | 2017023785 | 2/2017 |
| WO | 2017117253 | 7/2017 |
| WO | 2017117340 | 7/2017 |
| WO | 2017148173 | 9/2017 |
| WO | 2018010818 | 1/2018 |
| WO | 2016163206 | 2/2018 |
| WO | 2018020015 | 2/2018 |
| WO | 2018031770 | 2/2018 |
| WO | 2018073485 | 4/2018 |
| WO | 2018130115 | 7/2018 |
| WO | 2018169343 | 9/2018 |
| WO | 2018192699 | 10/2018 |
| WO | 2018202797 | 11/2018 |
| WO | 2018202798 | 11/2018 |
| WO | 2019001039 | 1/2019 |
| WO | 2019016141 | 1/2019 |
| WO | 2019038700 | 2/2019 |
| WO | 2018025789 | 5/2019 |
| WO | 2020112680 | 6/2020 |
| WO | 2020113010 | 6/2020 |
| WO | 2020117558 | 6/2020 |
| WO | 2020139811 | 7/2020 |
| WO | 2020142532 | 7/2020 |
| WO | 2020159773 | 8/2020 |
| WO | 2020172022 | 8/2020 |
| WO | 2020186097 | 9/2020 |
| WO | 2020236429 | 11/2020 |
| WO | 2021015774 | 1/2021 |
| WO | 2021029879 | 2/2021 |
| WO | 2021054963 | 3/2021 |
| WO | 2021054964 | 3/2021 |
| WO | 2021080666 | 4/2021 |

OTHER PUBLICATIONS

"International Preliminary Report on Patentability", Application No. PCT/US2020/017930, dated Aug. 10, 2021, 9 pages.

"International Preliminary Report on Patentability", Application No. PCT/US2020/022460, dated Aug. 25, 2021, 8 pages.

"International Preliminary Report on Patentability", Application No. PCT/US2020/031716, dated Oct. 15, 2021, 7 pages.

"3GPP TS 24.501 V16.3.0", 3GPP TS 24.501 version 16.3.0, Dec. 2019, 645 pages.

"3GPP TSG RAN WG4 25.942 V2.0.0: "RF System Scenarios"", TSG RAN Working Group 4 (Radio) Meeting #8, Oct. 1999, 65 pages.

"3rd Generation Partnership Project; Technical Specification Group Services and System Aspects; Security architecture and procedures for 5G system", 3GPP TS 33.501 version 16.1.0 Release 16, Dec. 2019, 202 pages.

"5G; Non-Access-Stratum (NAS) protocol for 5G System (5GS); Stage 3", 3GPP TS 24.501 version 15.1.0 Release 15, Oct. 2018, 406 pages.

"5G; Study on New Radio (NR) Access Technology", ETSI TR 138 912; V14.0.0; Technical Report; 3GPP TR 38.912 version 14.0.0 Release 14, May 2017, 77 pages.

"Beam Management and Beam Reporting", 3GPP TSG RAN WG1 Meeting #88bis, R1-1704488, Apr. 2017, 7 pages.

"Corrected Notice of Allowance", U.S. Appl. No. 16/419,854, dated Dec. 16, 2020, 2 pages.

"Discussion on HARQ Management and HARQ-ACK Feedback", 3GPP TSG RAN WG1 Meeting #91, R1-1720203, Dec. 2017, 5 pages.

"Discussion on NR Beamforming with UE-Group-Specific Beam Sweeping", 3GPP TSG-RAN WG1 Meeting #86 R1-166219, Aug. 22, 2016, 7 pages.

"Final Office Action", U.S. Appl. No. 16/210,969, dated Jan. 7, 2021, 17 pages.

"International Preliminary Report on Patentability", Application No. PCT/US2019/069129, dated Apr. 7, 2021, 14 pages.

"International Preliminary Report on Patentability", Application No. PCT/US2019/068265, dated Jan. 18, 2021, 31 pages.

"International Preliminary Report on Patentability", Application No. PCT/US2019/068265, dated Jan. 18, 2021, 33 pages.

"International Preliminary Report on Patentability", Application No. PCT/US2020/031716, dated Jul. 30, 2021, 7 pages.

"International Preliminary Report on Patentability", Application No. PCT/US2019/051980, dated Dec. 8, 2020, 7 pages.

"International Preliminary Report on Patentability", Application No. PCT/US2019/063240, dated Feb. 18, 2021, 8 pages.

"International Preliminary Report on Patentability", Application No. PCT/US2019/063620, dated May 25, 2021, 8 pages.

"International Search Report and Written Opiniion", Application No. PCT/US2019/051980, dated Jul. 27, 2020, 19 pages.

"International Search Report and Written Opinion", Application No. PCT/US2019/043355, dated Mar. 31, 2020, 12 pages.

(56) References Cited

OTHER PUBLICATIONS

"International Search Report and Written Opinion", Application No. PCT/US2020/014638, dated May 13, 2020, 12 pages.
"International Search Report and Written Opinion", Application No. PCT/US2020/045777, dated Oct. 9, 2020, 13 pages.
"International Search Report and Written Opinion", Application No. PCT/US2019/069129, dated Mar. 31, 2020, 13 pages.
"International Search Report and Written Opinion", Application No. PCT/US2019/046374, dated Apr. 14, 2020, 13 pages.
"International Search Report and Written Opinion", Application No. PCT/US2020/022460, dated May 26, 2020, 13 pages.
"International Search Report and Written Opinion", Application No. PCT/US2020/031716, dated Jul. 20, 2020, 14 pages.
"International Search Report and Written Opinion", Application No. PCT/US2019/063081, dated Feb. 21, 2020, 14 pages.
"International Search Report and Written Opinion", Application No. PCT/US2019/063620, dated Mar. 9, 2020, 14 pages.
"International Search Report and Written Opinion", Application No. PCT/US2019/052005, dated May 18, 2020, 14 pages.
"International Search Report and Written Opinion", Application No. PCT/US2020/017930, dated May 29, 2020, 14 pages.
"International Search Report and Written Opinion", Application No. PCT/US2019/063240, dated Feb. 13, 2020, 16 pages.
"International Search Report and Written Opinion", Application No. PCT/US2019/068265, dated Apr. 29, 2020, 29 pages.
"LTE; Evolved Universal Terrestrial Radio Access (E-UTRA) and Evolved Universal Terrestrial Radio Access Network (E-UTRAN); Overall Description; Stage 2 (3GPP TS 36.300 version 15.3.0 Release 15)", ETSI TS 136 300 V15.3.0 (Oct. 2018), Oct. 2018, 366 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.
"Non-Final Office Action", U.S. Appl. No. 16/210,969, dated Jul. 23, 2020, 15 Pages.
"Non-Final Office Action", U.S. Appl. No. 16/206,579, dated Apr. 10, 2020, 23 Pages.
"Non-Final Office Action", U.S. Appl. No. 16/419,854, dated Jun. 30, 2020, 29 Pages.
"Notice of Allowance", U.S. Appl. No. 16/206,579, dated Jul. 8, 2020, 10 Pages.
"Notice of Allowance", U.S. Appl. No. 16/419,854, dated Nov. 5, 2020, 11 pages.
"On the Need for More Flexible Configurations Related to CSI Reporting", 3GPP TSG RAN WG1 Meeting #87, R1-161123, Nov. 2016, 6 pages.
"Supplemental Notice of Allowance", U.S. Appl. No. 16/206,579, dated Sep. 30, 2020, 3 pages.
"Third Generation Partnership Project; Technical Specification Group Services and System Aspects; Service requirements for the 5G system; Stage 1", 3GPP TS 22.261 version 16.10.0 Release 16, Dec. 2019, 72 pages.
"UE Overheating for EN-DC", 3GPP R2-1802414, Ue overheating for EN-DC, in 3GPP TSG-RAN WG2 Meeting #101, Apple Inc., Mar. 2, 2018, 3 pages.
"Universal Mobile Telecommunications System (UMTS); Automatic Neighbour Relation (ANR) for UTRAN", 3GPP TS 25.484 version 10.0.1 Release 10, Jan. 2012, 21 pages.
"Universal Mobile Telecommunications System (UMTS); Automatic Neighbour Relation (ANR) for UTRAN", 3GPP TS 25.484 version 11.0.0 Release 11, Jan. 2012, 22 pages.
"Written Opinion", Application No. PCT/US2019/063240, dated Oct. 27, 2020, 10 pages.
"Written Opinion", Application No. PCT/US2019/068265, dated Sep. 25, 2020, 20 pages.
"Written Opinion", Application No. PCT/US2020/014638, dated Nov. 26, 2020, 5 pages.
"Written Opinion", Application No. PCT/US2020/031716, dated Mar. 25, 2021, 6 pages.
"Written Opinion", PCT Application No. PCT/US2020/031716, dated Aug. 20, 2021, 6 pages.
"Written Opinion", Application No. PCT/US2019/069129, dated Dec. 14, 2020, 7 pages.
Aboba, B. et al., "Extensible Authentication Protocol (EAP)", RFC Editor; Retrieved from https://www.rfc-editor.org/info/rfc3748, Jun. 2004, 67 pages.
Fodor, Gabor et al., "Design Aspects of Network Assisted Device-to-Device Communications", IEEE Communications Magazine, May 2011, 9 pages.
Gorcin, Ali et al., "Hybrid Automatic Neighbor Relations for 5G Wireless Networks", 2017, 6 pages.
Klingenbrunn, Thomas et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Lin, Roy et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, Harrison J. "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.
Tavanpour, Misagh "Upload User Collaboration in the Data Upload for LTE-Advanced Networks", Carleton University, Ottawa, Ontario,, Jan. 2016, 199 pages.
Wu, Chih-Hsiang "Handling Overheating in a Wireless-Communication Device", Technical Disclosure Commons; Retrieved from https://www.tdcommons.org/dpubs_series/2343, Jul. 12, 2019, 22 pages.
Zhang, Jinfang et al., "PoC of SCMA-Based Uplink Grant-Free Transmission in UCNC for 5G", IEEE Journal on Selected Areas in Communications, vol. 35, No. 6, Jun. 2017, 10 pages.
Zhang, Jinyu et al., "Grant-less Uplink Transmission for LTE Operated in Unlicensed Spectrum", Feb. 14, 2018, 6 pages.
"Notice of Allowance", Application No. 16/963,623, dated Oct. 31, 2022, 6 pages.
"Foreign Office Action", IN Application No. 202147041653, dated Apr. 26, 2022, 6 pages.
"Non-Final Office Action", U.S. Appl. No. 16/963,623, dated Jan. 5, 2022, 12 pages.
"Foreign Office Action", CA Application No. 3,127,384, datedSep. 27, 2022, 4 pages.
"Notice of Allowance", U.S. Appl. No. 16/963,623, dated Jul. 25, 2022, 8 pages.
"Foreign Office Action", EP Application No. 19756050.1, dated Jan. 24, 2022, 4 pages.
"Foreign Office Action", KR Application No. 10-2020-7022366, dated Feb. 23, 2022, 11 pages.
"Foreign Office Action", IN Application No. 202147031380, dated Mar. 8, 2022, 8 pages.
"Foreign Office Action", IN Application No. 202147025618, dated Mar. 11, 2022, 5 pages.
"Foreign Office Action", IN Application No. 202147051065, dated Mar. 28, 2022, 8 pages.
"International Preliminary Report on Patentability", Application No. PCT/US2019/043355, dated Jan. 25, 2022, 7 pages.
"Foreign Office Action", EP Application No. 19842524.1, dated May 11, 2023, 22 pages.
"Notice of Allowance", U.S. Appl. No. 17/287,898, dated Jun. 26, 2023, 12 pages.
"Foreign Office Action", EP Application No. 19827946.5, dated Feb. 24, 2023, 7 pages.
"Notice of Allowance", U.S. Appl. No. 16/963,623, dated Feb. 22, 2023, 5 pages.
"Foreign Office Action", CN Application No. 201980082695.3, dated Aug. 31, 2023, 25 pages.
"Foreign Office Action", TW Application No. 111132535, dated Oct. 20, 2023, 8 pages.
"Non-Final Office Action", U.S. Appl. No. 17/603,328, dated Sep. 27, 2023, 8 pages.

(56) References Cited

OTHER PUBLICATIONS

"Non-Final Office Action", U.S. Appl. No. 17/311,996, dated Sep. 28, 2023, 8 pages.
"Non-Final Office Action", U.S. Appl. No. 17/423,836, dated Oct. 5, 2023, 9 pages.
Trendafilov, et al., "Model of Coordination Flow in Remote Collaborative Interactions", Mar. 2015, 8 pages.

* cited by examiner

700 ⤸

```
┌─────────────────────────────────────────────────────────────┐
│  Receive an indication to coordinate beam sweeping with a UECS │
│                            705                               │
└─────────────────────────────────────────────────────────────┘
                              ▼
┌─────────────────────────────────────────────────────────────┐
│ Direct each UE in the UECS to perform a beam-training procedure that includes │
│ receiving a set of downlink beam transmissions that cover a spatial area according │
│            to pre-specified time intervals and directions     │
│                            710                               │
└─────────────────────────────────────────────────────────────┘
                              ▼
┌─────────────────────────────────────────────────────────────┐
│ Forward, to a base station beam report information that indicates beam quality │
│         information based on the beam-training procedure      │
│                            715                               │
└─────────────────────────────────────────────────────────────┘
                              ▼
┌─────────────────────────────────────────────────────────────┐
│ Receive, from the base station, an indication of one or more beam identities and │
│              one or more assigned time slots                  │
│                            720                               │
└─────────────────────────────────────────────────────────────┘
                              ▼
┌─────────────────────────────────────────────────────────────┐
│    Direct at least two UEs in the UECS to use specific beams  │
│ indicated by the one or more beam identities at specific time slots │
│       indicated by the one or more assigned time slots        │
│                            725                               │
└─────────────────────────────────────────────────────────────┘
```

```
┌─────────────────────────────────────────────────────────┐
│ Transmit, to a coordinating UE in a UECS, an indication │
│ to coordinate beam sweeping with the UECS               │
│                          805                            │
└─────────────────────────────────────────────────────────┘
                             │
                             ▼
┌─────────────────────────────────────────────────────────┐
│ Transmit a set of downlink beam transmissions that      │
│ cover a spatial area according to pre-specified time    │
│ intervals and directions                                │
│                          810                            │
└─────────────────────────────────────────────────────────┘
                             │
                             ▼
┌─────────────────────────────────────────────────────────┐
│ Receive, from the UECS, beam report information that    │
│ indicates beam quality information for at least two UEs │
│ in the UECS, the beam quality information based on the  │
│ set of downlink beam transmissions                      │
│                          815                            │
└─────────────────────────────────────────────────────────┘
                             │
                             ▼
┌─────────────────────────────────────────────────────────┐
│ Select, based on the beam report information, one or    │
│ more beam identities that specify specific beams to be  │
│ used by the at least two UEs                            │
│                          820                            │
└─────────────────────────────────────────────────────────┘
                             │
                             ▼
┌─────────────────────────────────────────────────────────┐
│ Select, based on the beam report information, one or    │
│ more time slots that specify specific time slots to be  │
│ used by the at least two UEs                            │
│                          825                            │
└─────────────────────────────────────────────────────────┘
                             │
                             ▼
┌─────────────────────────────────────────────────────────┐
│ Direct the at least two UEs to use the specific beams   │
│ at the specific time slots by transmitting an indication│
│ of the one or more beam identities and the one or more  │
│ time slots to the at least two UEs                      │
│                          830                            │
└─────────────────────────────────────────────────────────┘
```

*Fig. 8*

USER-EQUIPMENT COORDINATION SET BEAM SWEEPING

RELATED APPLICATION(S)

This application is a national stage entry of International Application No. PCT/US2020/022460, filed Mar. 12, 2020, which in turn claims priority to U.S. Provisional Application 62/817,079, filed Mar. 12, 2019, the disclosures of which are incorporated herein by reference in their entireties.

Background

Generally, a provider of a wireless network manages wireless communications over the wireless network. For example, a provider's base station manages a wireless connection with a user equipment (UE) that is served by the wireless network. The base station determines configurations for the wireless connection, such as bandwidth, timing, and other parameters for the wireless connection.

The quality of service between the UE and the base station can be degraded by a number of factors, such as obstacles that contribute to loss in signal strength, bandwidth limitations, interfering signals, and so forth. A number of solutions have been developed to improve signal quality issues occurring in certain wireless communication systems. However, these solutions fall short in instances where the UE has limited reception or transmission signal quality due to signal interference, distance from the base station, or attenuation from weather or objects such as buildings or trees.

SUMMARY

This document describes techniques and apparatuses for a user-equipment coordination set beam sweeping. The techniques described herein overcome challenges in joint transmission and reception of uplink and downlink data by a set of UEs forming a UE-coordination set. These challenges arise from conventional beam sweeping procedures. In particular, the techniques described herein enable coordinated beam sweeping by multiple UEs within the UE-coordination set to improve link budget.

In aspects, a user equipment (UE) receives an indication to coordinate beam sweeping with a user-equipment-coordination set (UECS). The UE directs each UE in the UECS to perform a beam-training procedure by receiving a set of downlink beam transmissions, and forwards beam report information to a base station. In implementations, the UE receives an indication of one or more beam identities and one or more assigned time slots, and directs at least two UEs in the UECS to use specific beams indicated by the beam identities at specific time slots indicated by the assigned time slots, such as by transmitting a respective beam identity and a respective time slot to each UE of the at least two UEs.

In some aspects, a base station transmits, to a coordinating UE in a UECS, an indication to coordinate beam sweeping with the UECS. The base station then transmits a set of downlink beam transmissions that cover a spatial area according to pre-specified time intervals and directions. In implementations, the base station receives, from the UECS beam report information that indicates beam quality information for at least two UEs in the UECS, the beam quality information based on the set of downlink beam transmissions. The base station then selects, based on the beam report information, one or more beam identities that specify specific beams and one or more time slots to be used by the at least two UEs. In implementations, the base station directs the at least two UEs to use specific beams indicated by the one or more beam identities at specific time slots indicated by the one or more assigned time slots, such as by transmitting an indication of the one or more beam identities and the one or more time slots to the at least two UEs.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of techniques and apparatuses for UE-coordination set beam sweeping are described below. The use of the same reference numbers in different instances in the description and the figures indicate similar elements:

FIG. 7 illustrates an example method that employs UE-coordination set beam sweeping in accordance with aspects of the techniques described herein.

FIG. 8 illustrates an example method that employs UE-coordination set beam sweeping in accordance with aspects of the techniques described herein.

DETAILED DESCRIPTION

Overview

Figure 1:
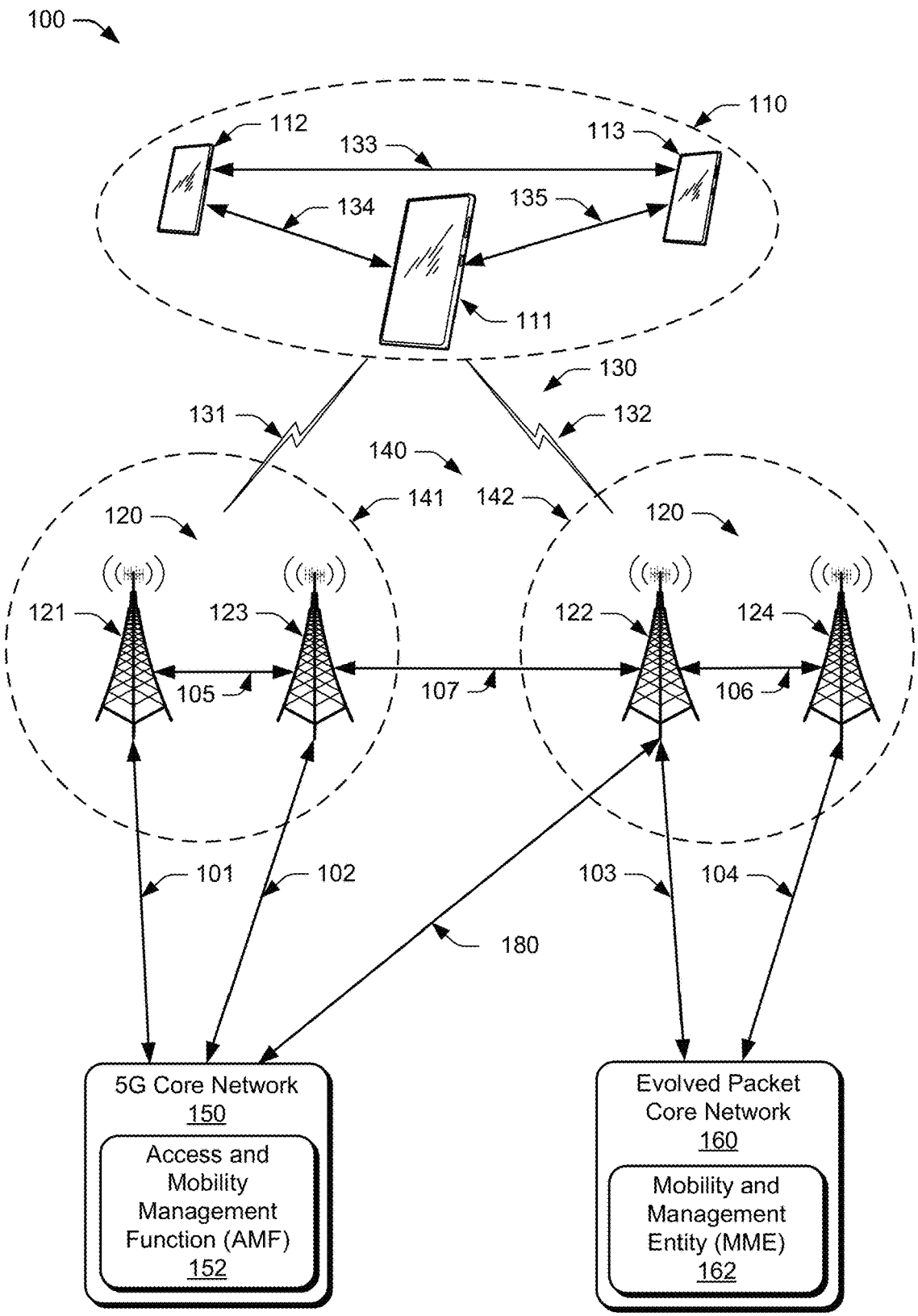
FIG. 1 illustrates an example operating environment in which aspects of a UE-coordination set beam sweeping can be implemented.

In conventional wireless communication systems, a signal quality between a user equipment (UE) and a base station can be degraded by a number of factors, such as signal interference or distance between the UE and the base station, resulting in slower and less-efficient data transmission. To improve the signal quality, techniques for forming UE-coordination sets for joint transmission and reception have been developed to facilitate faster and more-efficient data transmission in comparison to conventional wireless communication systems. A UE-coordination set is formed by multiple UEs assigned as a group to function together, similar to a distributed antenna, for the benefit of a particular UE. The UE-coordination set includes a coordinating UE that coordinates joint transmission and reception of uplink and/or downlink data for the particular UE (e.g., target UE). By combining antennas and transmitters of multiple UEs in the UE-coordination set, the effective transmission power of the particular UE is significantly increased and the effective signal quality is greatly improved.

Multiple UEs forming a UE-coordination set, which is specified by the base station, can be used to increase the link budget of a single UE in the UE-coordination set. In one example, multiple UEs carried by a group of hikers in a low radio-coverage area can form a UE-coordination set to transmit a message to a base station at a higher effective transmit power than would be possible for an individual UE in that area. Additionally, those UEs can form a UE-coordination set to receive a message from the base station for one of the UEs at a higher effective receive power than would be possible for that one UE to individually receive. One of the multiple UEs acts as a coordinating UE for the UE-coordination set to coordinate joint transmission of a particular UE's uplink data. Coordination of beam sweeping techniques performed by each of the UEs within the UE-coordination set, however, can be challenging at least because different UEs in the UE-coordination set can transmit or receive data on a variety of beams and time slots.

In another example, a single user may have multiple electronic devices, such as a work smartphone, a personal smartphone, and a 5G-enabled watch (smartwatch). These three devices may form a UE-coordination set for joint transmission and reception of data when they are in a challenging wireless environment (e.g., substantial signal attenuation due to noise bursts, concrete walls, tall buildings, mountains, long distance from a base station, and so forth). By forming the UE-coordination set, the work smartphone, the personal smartphone, and the smartwatch can transmit messages to, or receive messages from, the base station at a higher effective transmit or receive power than either of the smartphones or the smartwatch is capable of individually. The work smartphone, the personal smartphone, and/or the smartwatch may also form a UE-coordination set with one or more other devices (e.g., tablet, smart appliance, Internet-of-things device) in the home to further increase the effective transmit and/or receive power of the work smartphone, the personal smartphone, or the smartwatch.

In aspects, a method performed by a UE for coordinating beam sweeping for a plurality of user-equipments (UEs) is disclosed. The method includes receiving a request from a base station to act as a coordinating UE for coordinating beam sweeping between UEs within a UE-coordination set and the base station. The method also includes, responsive to an indication of uplink or downlink data to be jointly transmitted or received by the UE-coordination set, providing a message to the UEs within the UE-coordination set over a local wireless network connection, the message directing the UEs to perform a beam-training procedure to identify a beam to use for communication with the base station. The method further includes receiving information indicating usable beams for one or more of the UEs within the UE-coordination set. In addition, the method includes specifying a beam identity (ID) and an assigned time slot for each UE within the UE-coordination set. The method also includes transmitting, over the local wireless network connection, beam IDs and assigned time slots to corresponding UEs within the UE-coordination set, the beam IDs and the assigned time slots effective to enable the UEs within the UE-coordination set to coordinate beam sweeping for joint communication with the base station.

In aspects, a method performed by a base station for coordinating beam sweeping for a plurality of user-equipments (UEs) is disclosed. The method includes directing the plurality of UEs to form a UE-coordination set for joint transmission or reception of data with the base station. The method also includes determining usable beams for communication with one or more of the UEs within the UE-coordination set. The method further includes specifying one or more time slots and one or more beam identities (IDs) to be used by the UEs within the UE-coordination set for the joint transmission or reception of the data, the one or more beam IDs each corresponding to a particular beam direction for a particular UE to use to transmit data to, or receive data from, the base station. In addition, the method includes transmitting an indication of the one or more time slots and the one or more beam IDs to one or more of the UEs within the UE-coordination set to coordinate the beam sweeping of the plurality of UEs for the joint transmission or reception of the data.

In aspects, a UE is disclosed that includes a processor and memory system. The processor and memory system includes instructions that are executable to receive a message from a coordinating UE of a UE-coordination set over a local wireless network connection, the message directing the UE to perform a beam-training procedure to identify a beam to use for a joint communication with a base station, the joint communication including a joint transmission of uplink data for a target UE in the UE-coordination set or a joint reception of downlink data for the target UE. The instructions are also executable to perform the beam-training procedure to identify the beam, beam report results of the beam-training procedure to the coordinating UE over the local wireless network connection, and receive, over the local wireless network connection, a beam identity (ID) and an assigned time slot to use for communication with the base station. The instructions are further executable to initiate uplink or downlink communications, using a beam corresponding to the beam ID and the assigned time slot, to transmit the uplink data for the target UE in the UE-coordination set or receive the downlink data for the target UE.

In aspects, a UE is disclosed that includes a processor and memory system. The processor and memory system includes instructions that are executable to provide a message to UEs within a UE-coordination set over a local wireless network connection. In aspects, the message directs the UEs to perform a beam-training procedure to identify a beam to use for communication with the base station. The instructions are also executable to: receive information indicating usable beams for the UEs within the UE-coordination set; and specify a beam identity (ID) and an assigned time slot for each UE within the UE-coordination set. The instructions are further executable to transmit, over the local wireless network connection, beam IDs and assigned time slots to corresponding UEs within the UE-coordination set, the beam IDs and the assigned time slots effective to enable the UEs within the UE-coordination set to coordinate beam sweeping for joint communication with the base station.

In aspects, a base station is disclosed that includes at least a processor and memory system. The processor and memory system includes instructions that are executable to: direct a plurality of UEs to form a UE-coordination set; determine usable beams for communication with the UEs within the UE-coordination set; and specify one or more time slots and one or more beam identities (IDs) to be used by the UEs within the UE-coordination set for joint transmission or reception of data. In some aspects, the one or more beam IDs each correspond to a particular beam direction for a particular UE to use to transmit data to, or receive data from, the base station. The instructions are further executable to transmit an indication of the one or more time slots and the one or more beam IDs to one or more of the UEs within the UE-coordination set to coordinate the beam sweeping of the plurality of UEs for the joint transmission or reception of the data.

In aspects, a user equipment (UE) receives an indication to coordinate beam sweeping with a user-equipment-coordination set (UECS). The UE directs each UE in the UECS to perform a beam-training procedure by receiving a set of downlink beam transmissions, and forwards beam report information to a base station. In implementations, the UE receives an indication of one or more beam identities and one or more assigned time slots, and directs at least two UEs in the UECS to use specific beams indicated by the beam identities at specific time slots indicated by the assigned time slots, such as by transmitting a respective beam identity and a respective time slot to each UE of the at least two UEs.

In some aspects, a base station transmits, to a coordinating UE in a UECS, an indication to coordinate beam sweeping with the UECS. The base station then transmits a set of downlink beam transmissions that cover a spatial area according to pre-specified time intervals and directions. In implementations, the base station receives, from the UECS beam report information that indicates beam quality information for at least two UEs in the UECS, the beam quality information based on the set of downlink beam transmissions. The base station then selects, based on the beam report information, one or more beam identities that specify specific beams and one or more time slots to be used by the at least two UEs. In implementations, the base station directs the at least two UEs to use specific beams indicated by the one or more beam identities at specific time slots indicated by the one or more assigned time slots, such as by transmitting an indication of the one or more beam identities and the one or more time slots to the at least two UEs.

Example Environments

FIG. 1 illustrates an example environment 100, which includes multiple user equipment 110 (UE 110), illustrated as UE 111, UE 112, and UE 113. Each UE 110 can communicate with base stations 120 (illustrated as base stations 121, 122, 123, and 124) through wireless communication links 130 (wireless link 130), illustrated as wireless links 131 and 132. Each UE 110 in a UE-coordination set can communicate with a coordinating UE of the UE-coordination set and/or a target UE in the UE-coordination set through one or more local wireless network connections (e.g., personal area network, near-field communication (NFC), Bluetooth™, sonar, radar, lidar, ZigBee™) such as local wireless network connections 133, 134, and 135. For simplicity, the UE 110 is implemented as a smartphone but may be implemented as any suitable computing or electronic device, such as a smart watch, mobile communication device, modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 through the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. Additionally, multiple wireless links 130 may be configured for single-RAT dual connectivity or multi-RAT dual connectivity (MR-DC). Each of these various multiple-link situations tends to increase the power consumption of the UE 110.

The base stations 120 collectively form a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 connect to an Evolved Packet Core 160 (EPC 160). Optionally or additionally, the base station 122 may connect to both the 5GC 150 and EPC 160 networks.

The base stations 121 and 123 connect, at 101 and 102 respectively, to the 5GC 150 through an NG2 interface for control-plane signaling and using an NG3 interface for user-plane data communications. The base stations 122 and 124 connect, at 103 and 104 respectively, to the EPC 160 using an Si interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 105 and the base stations 122 and 124 communicate through an X2 interface at 106. At least one base station 120 (base station 121 and/or base station 123) in the NR RAN 141 can communicate with at least one base station 120 (base station 122 and/or base station 124) in the E-UTRAN 142 using an Xn interface 107. In aspects, base stations 120 in different RANs (e.g., master base stations 120 of each RAN) communicate with one another using an Xn interface such as Xn interface 107.

The 5GC 150 includes an Access and Mobility Management Function 152 (AMF 152), which provides control-plane functions, such as registration and authentication of multiple UEs 110, authorization, and mobility management in the 5G NR network. The EPC 160 includes a Mobility Management Entity 162 (MME 162), which provides control-plane functions, such as registration and authentication of multiple UEs 110, authorization, or mobility management in the E-UTRA network. The AMF 152 and the MME 162 communicate with the base stations 120 in the RANs 140 and also communicate with multiple UEs 110, using the base stations 120.

Example Devices

Figure 2:
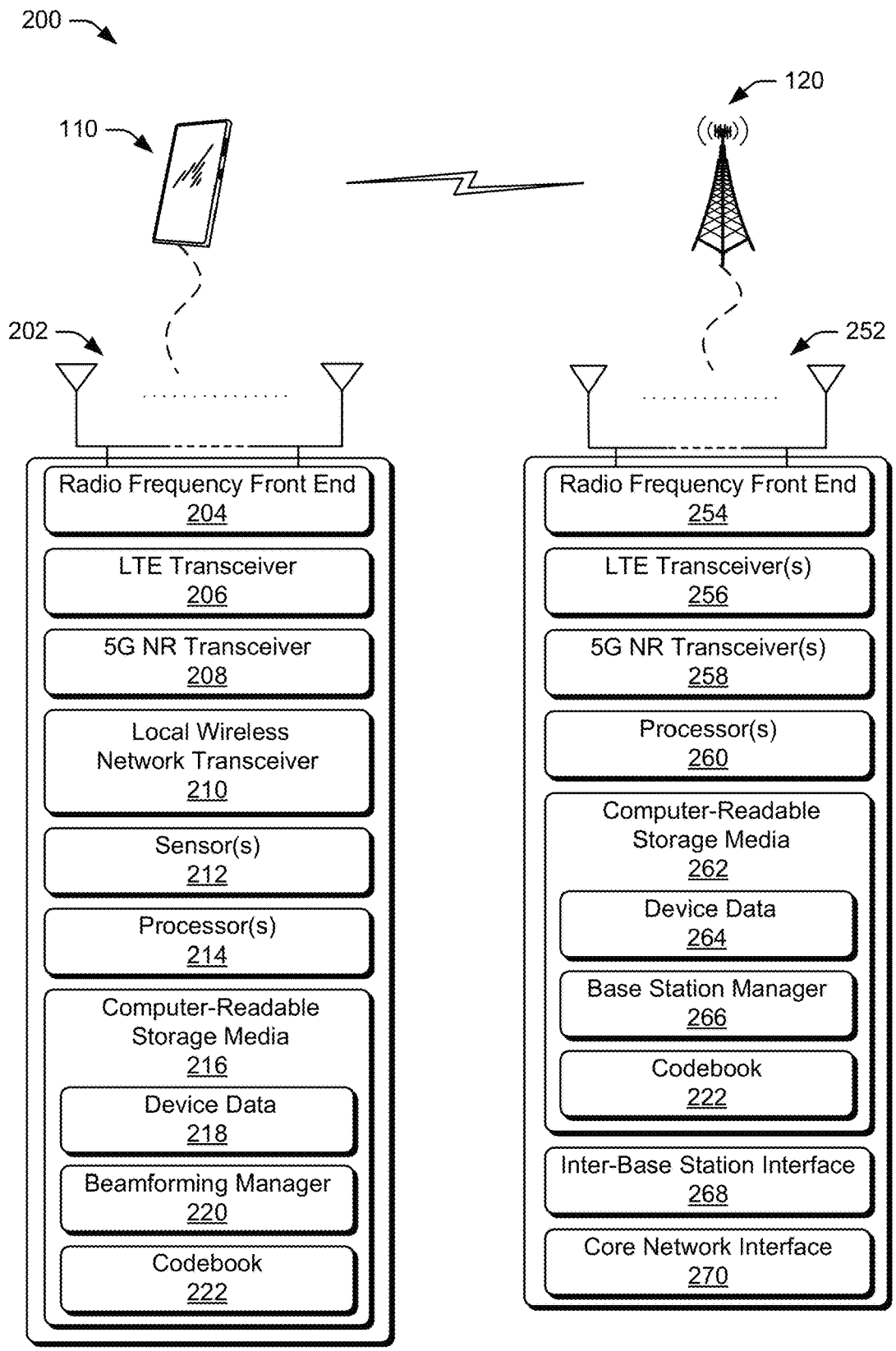
FIG. 2 illustrates an example device diagram of a user equipment and a serving cell base station.

FIG. 2 illustrates an example device diagram 200 of a user equipment and a serving cell base station. In aspects, the device diagram 200 describes devices that can implement various aspects of techniques for UE-coordination set beam sweeping. FIG. 2 shows the multiple UEs 110 and the base stations 120. The multiple UEs 110 and the base stations 120 may include additional functions and interfaces that are omitted from FIG. 2 for the sake of clarity. The UE 110 includes antennas 202, a radio frequency front end 204 (RF front end 204), and radio-frequency transceivers (e.g., an LTE transceiver 206 and a 5G NR transceiver 208) for communicating with base stations 120 in the 5G RAN 141 and/or the E-UTRAN 142. The UE 110 includes one or more additional transceivers (e.g., local wireless network transceiver 210) for communicating over one or more local wireless networks (e.g., WLAN, Bluetooth, NFC, a personal area network (PAN), WiFi-Direct, IEEE 802.15.4, ZigBee, Thread, mmWave) with at least the coordinating UE, and/or the target UE, of the UE-coordination set. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. In addition, the RF front end 204 can be tuned to, and/or be tunable to, one or more frequency bands defined and implemented by the local wireless network transceiver 210 to support transmission and reception of communications with other UEs in the UE-coordination set over a local wireless network.

The UE 110 includes sensor(s) 212 can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, polysilicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a beamforming manager 220. Alternately or additionally, the beamforming manager 220 may be implemented in whole or part as hardware logic or circuitry integrated with or separate from other components of the UE 110. In at least some aspects, the beamforming manager 220 configures the RF front end 204, the LTE transceiver 206, the 5G NR transceiver 208, and/or the local wireless network transceiver 210 to implement the techniques described herein for UE-coordination set beam sweeping.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UE-coordination set.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and/or entities.

In aspects, the user equipment 102 provides feedback to the base station 120 for beamforming of the 5G NR downlink. For example, beamforming for Massive MIMO uses closed-loop or beam-index beamforming for the 5G NR downlink. The base station 120 and the UE 112 both have a copy of the codebook 222 that includes precoding matrices for beamforming with an index value (e.g., a precoding matrix indicator or PMI) associated with each precoding matrix. The codebook 222 can be stored in the CRM 216 of the user equipment 102 and in the CRM 262 of the base station 120.

UE-Coordination Set

Figure 3:
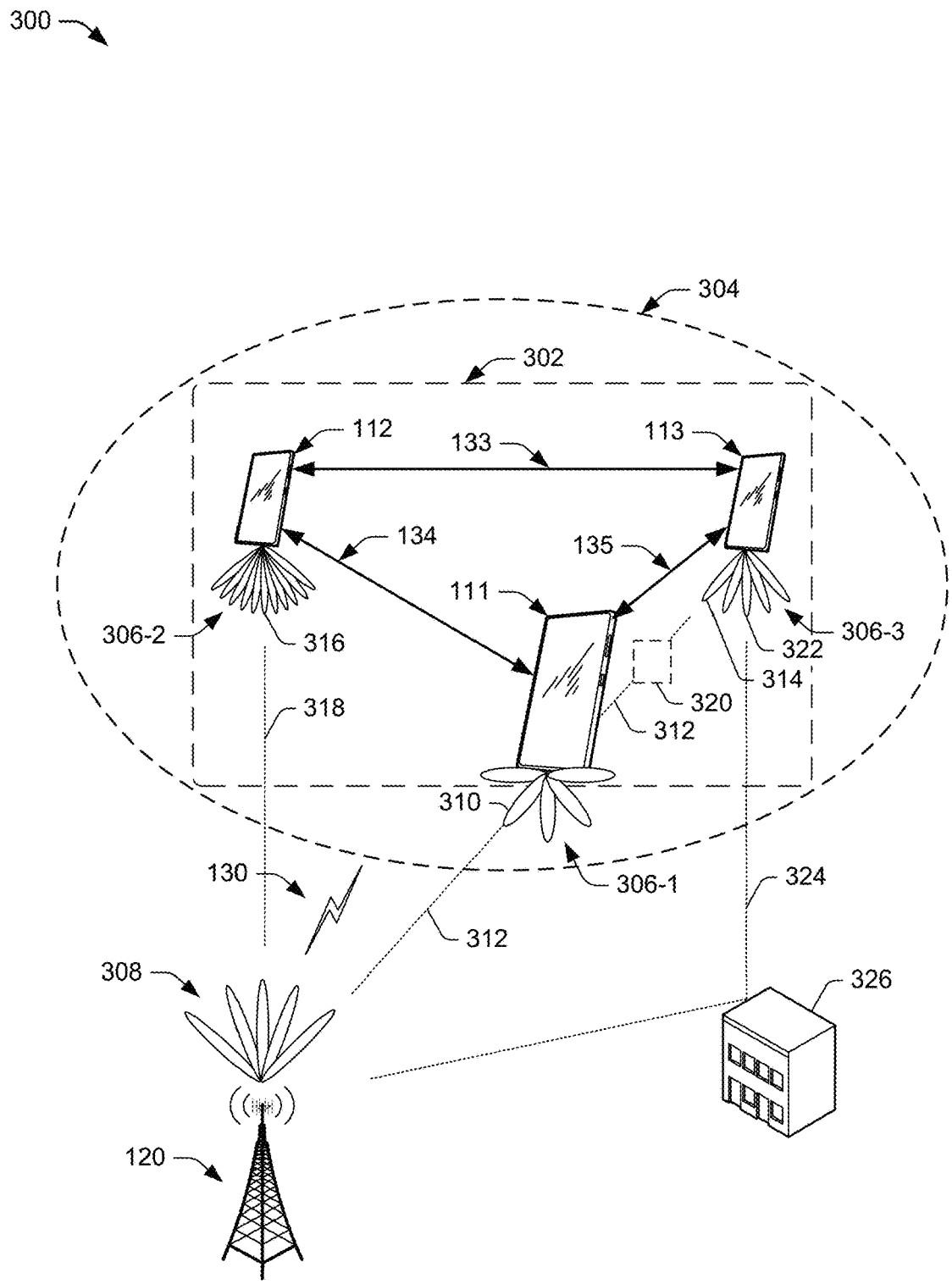
FIG. 3 illustrates an example implementation of a UE-coordination set.

FIG. 3 illustrates an example implementation 300 for UE-coordination set beam sweeping. The illustrated example includes a serving cell base station (base station 120), UE 111, UE 112, and UE 113. In an example, each of the UEs illustrated in FIG. 3 may have limited transmission signal quality, which may cause difficulties in transmitting data to the base station 120. This may be due, at least partially, to the UEs being proximate to a cell edge of the base station 120 or the UEs being in a transmission-challenged location (e.g., a basement, urban canyon, etc.) that has a poor link budget. Each of the UEs illustrated in FIG. 3 may also, or alternatively, have limited reception signal quality, which may be affected by cell-edge transmission power of the base station 120, as well as multipath, signal interference from other transmitters or overhead electrical wires, attenuation from weather or objects such as buildings, trees, etc.

The base station 120 can specify a set of UEs (e.g., the UE 111, UE 112, and UE 113) to form a UE-coordination set (e.g., UE-coordination set 302) for joint transmission and joint reception of data for a target UE (e.g., the UE 112). Based on a user input or predefined setting, each of the UEs may opt in or out of participation in the UE-coordination set. An effective transmit power of the target UE 112 can increase significantly (e.g., linearly) with the number of UEs in the UE-coordination set, which can greatly improve a link budget of the target UE 112. The base station 120 may determine a UE-coordination set based on various factors, such as a location of each UE relative to the base station 120, distance between the UEs (such as between each other, between each UE and the target UE, or between each UE and a coordinating UE of the UE-coordination set) or a combination thereof. In some aspects, UEs within a certain distance of each other can more easily coordinate with one another to reduce signal interference when in close proximity by using a local wireless network.

In addition, UE coordination can be based on spatial beams or timing advance, or both, associated with each UE. For example, for beamforming or Massive-MIMO, it may be desirable that all the UEs within the UE-coordination set are able to receive the same signal from the base station. Therefore, all the UEs within the UE-coordination set may be geographically near one another, e.g., within a threshold distance of a particular UE in the UE-coordination set. In this way, the UEs in the UE-coordination set may each be in the same beam or beams that are close to each other. Some (or even all) of the UEs within the UE-coordination set may be in different beams from one another. Accordingly, each UE may have its own beam for communicating with the base station 120.

The coordinating UE can coordinate the messages and samples sent between UEs within the UE-coordination set for joint transmission and joint reception. The coordinating UE communicates with the UEs in the UE-coordination set using a local wireless network, such as mmWave, Bluetooth, and the like.

In the illustrated example 300 in FIG. 3, the base station 120 may select UE 111 to act as the coordinating UE because the UE 111 is capable of communicating with each of the other UEs 112 and 113 in the UE-coordination set 302. The base station 120 may select the coordinating UE for various reasons, examples of which are described above. In this example, at least target UE 112 has a weak cellular transmission (and reception) signal quality. The base station 120 selects UE 111 to coordinate messages and samples sent between the base station 120 and the UEs 111, 112, 113 for the target UE 112. Such communication between the UEs can occur using a local wireless network 304, such as a PAN, NFC, Bluetooth, WiFi-Direct, local mmWave link, etc.

The UEs 111, 112, 113 each attempt to perform a beam-training procedure to identify a usable UE-beam 306 for communicating with the base station 120. The usable beam may include the "best" beam-pair for a UE reception (or transmission) beam with a base station transmission (or reception) beam. The best beam-pair refers to a beam-pair having the greatest signal strength of all the potential beam-pairs between the UE and the base station. The beam-training procedure includes covering a spatial area with a set of beams transmitted and received according to pre-specified intervals and directions. In an example, each of the UEs 111, 112, 113 directionally transmit sounding reference signals (SRS's) in the mmWave bands in time-varying directions that continuously sweep the angular space. The base station 120 scans its angular directions, monitoring the strength of the received SRS's and building a report table based on the channel quality of each receiving direction, to capture the dynamics of the channel. Beam training also includes beam measurement (e.g., evaluation) of the quality of the received signal at the base station or at the UE.

Beam determination refers to the selection of the suitable beam(s) either at the base station or at the UE, according to the measurements obtained with the beam measurement procedure. For example, the entity performing the beam determination analyzes the beam measurements representing signal quality in each angular direction and matches the beams of the transmitters and the receivers to provide maximum performance.

Beam reporting refers to a procedure used by the UE to send beam-quality and beam-decision information to the Radio Access Network (RAN). In one example, after beam determination, the UE waits for the base station to schedule a random access channel (RACH) opportunity towards the best direction that the UE just determined, for performing random access and implicitly informing the selected serving infrastructure of the optimal direction (or set of directions) through which it has to steer its beam, in order to be properly aligned. In other words, a UE may use a RACH transmission to send beam decision information (i.e., an indication of the best beam) to the base station.

For a UE-initiated, dedicated beam search, the beam-training procedure may include the coordinating UE 111 sending a beam search request to the base station 120, such as by transmitting the request in a Radio Resource Control (RRC) connection, a Media Access Control (MAC) layer Information Element (IE), or another suitable manner. In response to receiving the beam search request, the base station 120 schedules a time at which it can transmit reference signals for the dedicated beam search. The base station 120 transmits a beam search notification to the coordinating UE 111. The beam search notification includes the time at which the reference signals for the dedicated beam search will be transmitted. At the time determined by the base station 120, the base station 120 transmits the reference signals for the dedicated beam search and the coordinating UE 111 receives and evaluates the reference signals in the received beams. The coordinating UE 111 receives and evaluates the reference signals in the received beams by estimating a channel condition for each of the received reference signals. Based on the channel condition estimates, the coordinating UE 111 selects the best precoding matrix from the codebook for beamforming the 5G NR communication link with the base station 120 and beam reports (e.g., sends the PMI for that precoding matrix) to the base station 120.

For group beam-training (e.g., by multiple UEs in the UE-coordination set 302), each UE in the group attempts to perform beam training, using time division multiplexing (TDM), when the base station 120 only supports analog beamforming. If, however, the base station 120 can support multiple transmit or receive beams at the same time, then multiple UEs can be beam-trained at the same time.

Accordingly, through the beam-training procedure and beam-reporting procedure, signals are transmitted between one or more of the UEs 111, 112, 113 and the base station 120 such that the base station 120 can determine which UE-beam 306 is usable (or best) for at least one UE in the UE-coordination set 302. Based on this information, the base station 120 can assign specific beams and time slots for one or more UEs within the UE-coordination set 302. Alternatively or additionally, the base station 120 can relay this information to the coordinating UE 111 to enable the coordinating UE 111 to coordinate which beam is used by which UE at which time slot for the joint transmission or reception by the UE-coordination set 302. As described in further detail below, this beam information is then used to coordinate beam sweeping by the various UEs 111, 112, 113 within the UE-coordination set 302.

Joint Transmission

The UE-coordination set 302 enhances the target UE's effective ability to transmit data to the base station 120 and receive data from the base station 120 by generally acting as a distributed antenna of the target UE 112. For example, multiple UEs in the UE-coordination set 302 each use their respective antennas and transmitters to transmit uplink data from the target UE 112 on air interface resources as directed by the base station 120 coordinating the UE-coordination set 302. In this way, the target UE's uplink data can be processed together and transmitted using the transmitters and the transmission antennas of multiple (including all) UEs in the UE-coordination set 302.

In an example, the target UE 112 uses its local wireless network transceiver 210 to transmit uplink data to the coordinating UE 111 using the local wireless network connection 134. The coordinating UE 111 uses its local wireless network transceiver 210 to distribute the data to the other UEs in the UE-coordination set 302, using the local wireless network connections 134 and 135, to combine the power from multiple UEs' power amplifiers. In some instances, the target UE 112 may act as the coordinating UE such that the target UE 112 uses the local wireless network connections 133 and 134 to distribute the data to the other UEs (UE 111 and UE 113) in the UE-coordination set 302. Then, all the UEs (or a subset of all the UEs) in the UE-coordination set 302 process and transmit the uplink data to the base station 120 using the wireless link 130. In this way, the distributed transmission provides for a better effective link budget given the channel impairments encountered by the target UE 112.

Each UE in the UE-coordination set 302 synchronizes with the base station 120 for timing information and its data transmission resource assignment. Then, the UEs jointly transmit the uplink data to the base station 120. The base station 120 receives the jointly-transmitted uplink data from the UEs 111, 112, 113 and processes the combined signal to decode the uplink data from the target UE 112.

Coordinated Beam sweeping

UEs within a UE-coordination set coordinate beam sweeping configurations for downlink data and uplink data. In aspects, different UEs within the UE-coordination set can transmit (or receive) on different time slots for beamforming. Here, the UEs coordinate with one another regarding which beam and which time slot to use for a joint transmission. This coordination occurs after each UE 111, 112, 113 in the UE-coordination set 302 has performed a beam-training procedure and a beam-reporting procedure to identify one or more beams usable for communication with the base station 120. By beam reporting to the base station 120, the UEs in the UE-coordination set 302 indicate to the base station 120 which beam is best, based on beam measurement. In one aspect, the UEs beam report directly to the base station 120 using conventional methods of beam reporting. In another aspect, the UEs beam report to the coordinating UE 111, which then either transmits the beam reports of all the UEs in the UE-coordination set 302 in a lump (e.g., the coordinating UE 111 combines the beam reports of multiple UEs into a single beam report transmission to the base station 120, which may reduce signaling overhead) or forwards each beam report individually as a relay. Because the beam-training and beam-reporting procedures have been executed by each UE 111, 112, 113, the base station 120 can determine which beam(s) each UE should use for communicating with the base station 120.

In one example, the coordinating UE 111 performs beam sweeping coordination for the UE-coordination set 302. The coordinating UE 111 determines which beam and which time slot the UEs 112, 113 (including itself) in the UE-coordination set 302 should use for joint communication with the base station 120. The base station 120 can provide beam and time slot information for each UE within the UE-coordination set 302 to the coordinating UE 111.

Alternatively, the base station 120 can coordinate the beam sweeping for the UE-coordination set 302. In some aspects, the base station 120 can do this without the assistance of the coordinating UE 111. For example, the base station 120 can transmit time slots and beam identities (beam IDs) directly to corresponding UEs within the UE-coordination set 302. By specifying each beam that each UE within the UE-coordination set 302 should use and the time slot that each UE should use its specified beam, base station 120 or the coordinating UE 111 coordinates the beam sweeping of the UE-coordination set 302 for joint communications with the base station 120 to improve the link budget. In some instances, at least one of the UEs may be blocked such that no beam is usable for that UE to communicate with the base station 120 (e.g., the available beams are blocked by an object, such as a user's body, a vehicle, a building, etc.). By using a UE-coordination set, multiple other UEs can help to transmit or receive data for the blocked UE, and some of those UEs may be able to communicate with the base station 120 using one or more different beams.

The beam ID may be a unique identifier for a particular beam for a particular UE within the UE-coordination set 302. Further, the beam ID may be unique within the UE-coordination set, such that other UE-coordination sets may use non-overlapping (sets of) beam IDs. In some aspects, the beam ID may correspond to two or more UEs within the UE-coordination set that are assigned different time slots. Two or more UEs in the UE-coordination set may, however, be assigned the same time slot but have different beam IDs. The base station 120 can allocate the beam ID to the particular UE. In some aspects, the base station 120 also provides the beam ID for the particular UE to the coordinating UE 111 to enable the coordinating UE 111 to coordinate the beam sweeping within the UE-coordination set 302. Alternatively, the coordinating UE 111 can allocate the beam IDs to the UEs within the UE-coordination set 302.

In an example, the UEs 111, 112, 113 within the UE-coordination set 302 can have a copy of the same codebook that includes precoding matrices for beamforming with an index value (e.g., a precoding matrix indicator or PMI) associated with each precoding matrix in the codebook. In addition, the UEs 111, 112, 113 can share the same codebook index to beamform or uplink. However, the beam ID can be unique and specific to each UE within the UE-coordination set 302. Although multiple UEs share the same codebook index, they may be assigned different beam IDs, which correspond to different time slots for that beam. For example, the UE 111 can use a first beam 310, identified by a first beam ID, to transmit at a first time slot using a first beam direction 312, and the UE 113 can use a second beam 314, identified by a second, different beam ID, to transmit at a second, different time slot using the first beam direction 312. Accordingly, multiple UEs can use the same beam direction but transmit at different time slots.

In another example, the UE 112 can use a third beam 316, identified by a third beam ID, to transmit in a different beam direction 318 for the transmission. Two UEs (e.g., UE 111 and UE 113) may be in a straight radial line relative to the base station 210 and in position to use the same beam direction (e.g., the first beam direction 312) but one of the UEs (e.g., UE 113) may be blocked by an object (e.g., dashed-line object 320), such as a building. If the first beam direction 312 is blocked for the UE 113, the UE 113 may use a fourth beam 322, identified by a fourth beam ID, to transmit in another beam direction 324 for the transmission. This fourth beam direction 324 may, in some aspects, be the same direction as the third beam direction 318 but the UE 113 may use the fourth beam direction 324, which may happen to reflect off another object (e.g., building 326) to reach the base station 120, effectively going around the blocking object 320.

Within the UE-coordination set 302, the different UEs 111, 112, 113, having different beam IDs and assigned time slots corresponding to the beam IDs, may carry the same or different information. For instance, although the UEs may transmit data on different time slots with different beams (each beam ID has an assigned time slot), the UEs may transmit the same information. Accordingly, if a UE (e.g., target UE 112) has data to transmit to the base station 120, multiple UEs in the UE-coordination set 302 can repeat the same data at different time slots using different beams. This coordinated transmission can greatly improve the link budget, e.g., through diversity and energy combining. The link budget is also improved by the UEs carrying different information through coding. For example, the multiple UEs can send redundant versions of particular coded information to the base station 120.

In aspects, multiple UEs in the UE-coordination set can beam-sweep at the same time. For example, the UEs may transmit simultaneously (at the same time slot) but each UE may have its own beam direction. Accordingly, one beam ID may correspond to a set of UEs transmitting at the same time where each UE transmits at a particular beam direction (e.g., a single beam ID corresponding to both UE 111 and UE 112 where UE 111 transmits at beam direction 312 at the same time slot as UE 112 transmitting at beam direction 316). Alternatively, a single beam ID may refer to a set of multiple UE-beams having the same angular direction but different time slots (e.g., a single beam ID corresponding to both UE 111 and UE 113 transmitting at beam direction 312, using beam 310 and beam 314, respectively, at different time slots).

In one example, the coordinating UE 111 can specify the set of UEs and their associated beams used for the corresponding beam ID. Alternatively, the base station 120 can specify the set of UEs and their associated beams. In these examples, the beam ID may correspond to a set of pairs of UE IDs and corresponding beams. For instance, a particular beam ID may correspond to a set of UEs within the UE-coordination set 302 transmitting at the same time (e.g., at the same time slot), where each UE has its own associated beam.

Different UEs may use different beam directions to reach the base station based on relative position or interfering objects. Operating together within the UE-coordination set 302 for joint transmission or reception provides diversity, improves link budget, and can help facilitate communication between the base station and a blocked UE.

In addition, different UEs may have different beamforming capabilities. In one example, a first UE within the UE-coordination set may support eight indices within the codebook and a second UE within the UE-coordination set may support 64 indices within the same codebook. In FIG. 3, for example, the coordinating UE 111 is illustrated with (a subset of) eight beams 306-1, each with approximately a 45-degree beamwidth, that correspond to eight indices in a table in the codebook. The UE 112, however, may include 64 indices and therefore includes 64 narrower beams 306-2, each with approximately a 360/64 degree beamwidth. In this example, the UE 112 is more "capable" of beamforming than the coordinating UE 111 because the UE 112 has more beams 306-2 and those beams 306-2 have narrower beamwidths than the beams 306-1 of the coordinating UE 111.

Because different UEs within the UE-coordination set 302 may have different beamforming capabilities, it is beneficial for the coordinating UE 111 and/or the base station 120 to determine the specific beamforming capabilities of each UE in the UE-coordination set 302. Beamforming capability information can be transmitted, at any suitable time and by any suitable communication, to the base station 120 or to the coordinating UE 111, prior to the request for joint transmission or reception, as part of the beam-training procedure, or as part of beam reporting. In one example, one or more of the UEs may communicate beamforming capability information in the "UE Capabilities", as defined by 3GPP, to the base station 120. The UEs within the UE-coordination set 302 can communicate their respective beamforming capabilities to the coordinating UE 111 over the local wireless network 302 upon formation of the UE-coordination set 302 or at any suitable prior to the coordinated beam sweeping. The coordinating UE 111 can relay the beamforming capability information to the base station 120 using the wireless link 130. In some instances, at least some of the UEs in the UE-coordination set 302 can communicate their respective beamforming capability information directly to the base station 120 using the wireless link 130 at any suitable time prior to the coordinated beam sweeping. This beamforming capability information can enable the coordinating UE or the base station to better coordinate the beamforming of the UEs within the UE-coordination set for joint communication with the base station.

In an example, UEs transmitting at different time slots have independent beam IDs, such that those UEs can transmit with different beamforming capabilities without constraining more-capable UEs (e.g., UE 112 with a 64-beam capability) down to a lower-capability of another UE (e.g., UE 111 with an 8-beam capability) in the UE-coordination set 302.

When the UEs beamform at the same time slot, the beamforming capabilities of the UEs are combined. Here, a beam ID may correspond to a pair of beams (e.g., beam 310 for the coordinating UE 111 and beam 316 for the UE 112) for the group of UEs because they are assigned the same time slot. So, combining the UE 112 with the 64-beam capability and the coordinating UE 111 with 8-beam capability results in 512 possible beam IDs if the UEs are transmitting during the same time slot. In another example, the UE 112 with the capability of 64 may be on a narrower beam or a better link budget beam than the coordinating UE 111, but the base station 120 may still have the ability to add the transmitted samples together regardless of the beam. This is because the base station 120 processes the transmissions bit-by-bit or symbol-by-symbol.

When a UE in the UE-coordination set 302 leaves the UE-coordination set 302, that UE may notify the coordinating UE 111, using the local wireless network connection, that it is about to leave. This information enables the coordinating UE 111 to modify the coordination of the beam sweeping by removing that UE from UE-coordination set 302. Alternatively, the coordinating UE 111 may direct a UE to leave the UE-coordination set 302. If another UE joins the UE-coordination set 302, the coordinating UE may request that it perform a beam-training procedure to identify a beam to use to join the joint communication with the base station 120. If there is an existing single beam ID for a set of UEs in the UE-coordination set 302 when the other UE joins, the coordinating UE 111 or the base station 120 may provide a new beam ID (after it performs its own beam-training procedure and beam-reporting procedure) to the new UE that is unique to the new UE.

Example Procedures

Figure 4:
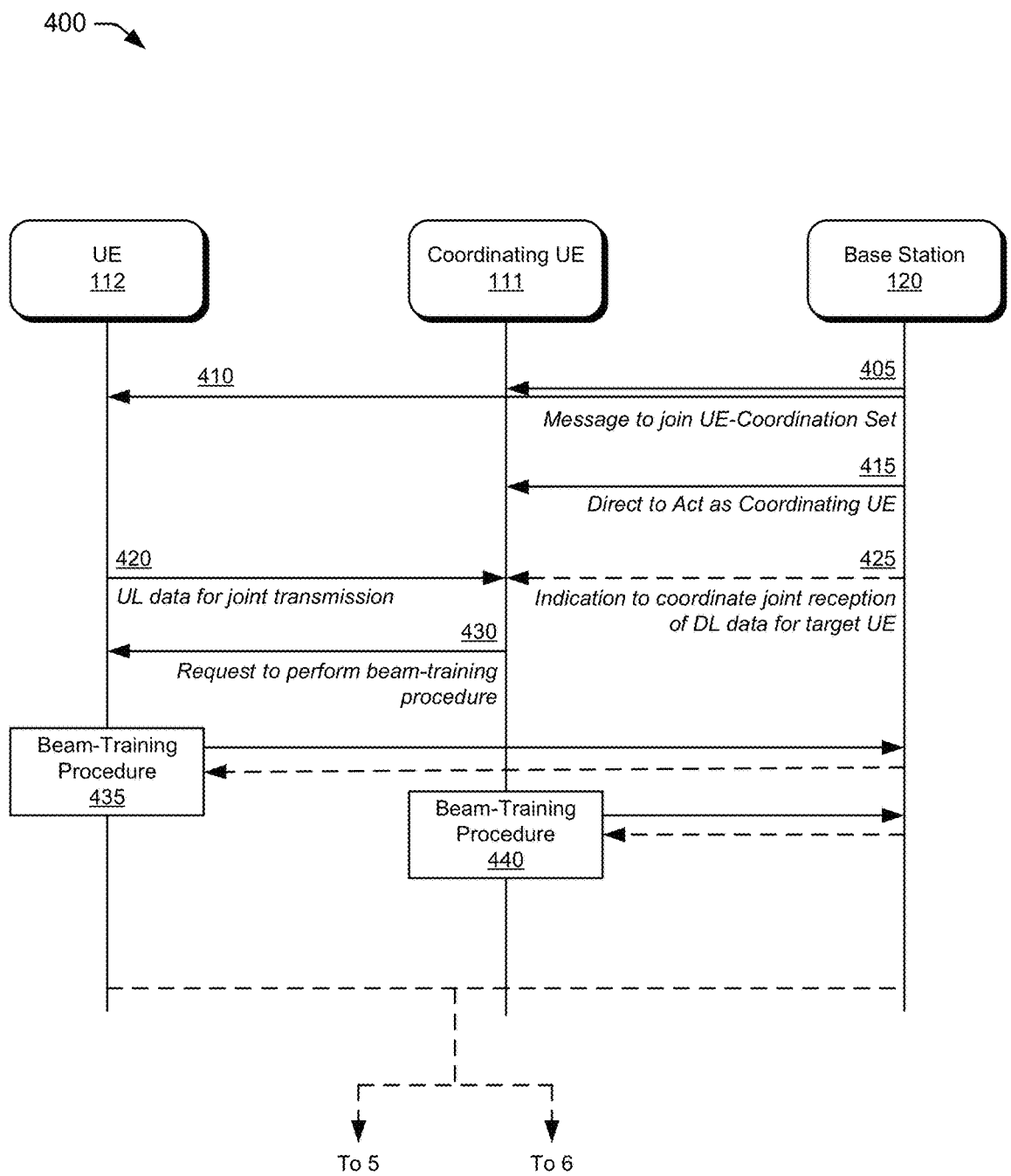
FIG. 4 describes a diagram showing a process of communications between a target UE, a coordinating UE, and a base station for coordinating beam sweeping in a UE-coordination set.

FIG. 4 describes a signaling and transaction diagram 400 that illustrates example communications between a target UE, a coordinating UE, and a base station for coordinating beam sweeping in a UE-coordination set. The target UE may be UE 112 as previously described, the coordinating UE may be UE 111 as previously described, the UE-coordination set may be UE-coordination set 302 as previously described, and the base station may be the base station 120 as previously described. At 405, the base station 120 sends a message to the coordinating UE 111 requesting the coordinating UE 111 to join a UE-coordination set. The base station 120 may also send, at 410, similar messages to other UEs, such as the UE 112, to request those UEs to join the UE-coordination set 302. In addition, the base station 120, at 415, directs the UE 111 to act as a coordinating UE for coordinating beam sweeping for joint communications between UEs within the UE-coordination set and the base station 120. The UE-coordination set includes the coordinating UE, the target UE (source of the uplink data), and optionally may include at least one additional UE.

The target UE 112 may send, at 420, uplink data, or an indication of uplink data, to the coordinating UE 111 for joint transmission of the uplink data to the base station. The indication of uplink data may include information associated with the uplink data sufficient to enable the coordinating UE 111 to coordinate the joint transmission of the uplink data by the UEs in the UE-coordination set 302, such as a size of the data, an identity of the target UE 112, encoding information, and so forth. Alternatively, the base station 120 can send, at 425, an indication to the coordinating UE 111 to coordinate joint reception of downlink data for the target UE 112. The indication of downlink data may include information including the identity of the target UE 112, the size of the data, timing information, decoding information, and so forth.

At 430, the coordinating UE 111 provides a message to the other UEs within the UE-coordination set 302 over the local wireless network connection directing the UEs to perform a beam-training procedure to identify a beam to use for the joint communication with the base station 120. The coordinating UE 111 can, using the messages to the other UEs, coordinate the timing of the beam-training procedures based on time division multiplexing techniques. Each UE 111, 112, 113 in the UE-coordination set 302 attempts to perform a beam-training procedure to determine usable (or best) beams to use for transmitting to or receiving from the base station 120. However, some of the UEs in the UE-coordination set 302 may be unable to reach the base station 120, e.g., due to low signal quality or a blocking object. For instance, for joint transmission of uplink data, the target UE 112 attempts to perform a beam-training procedure 435 and the coordinating UE 111 also performs a beam-training procedure 440, where each beam-training procedure includes directionally transmitting sounding reference signals in the mmWave bands in time-varying directions that continuously sweep the angular space. Alternatively, for joint reception of downlink data, the beam-training procedures 435 and 440 may include listening for and measuring the signal quality of signals transmitted by the base station 120 (indicated by dashed lines).

Figure 5:
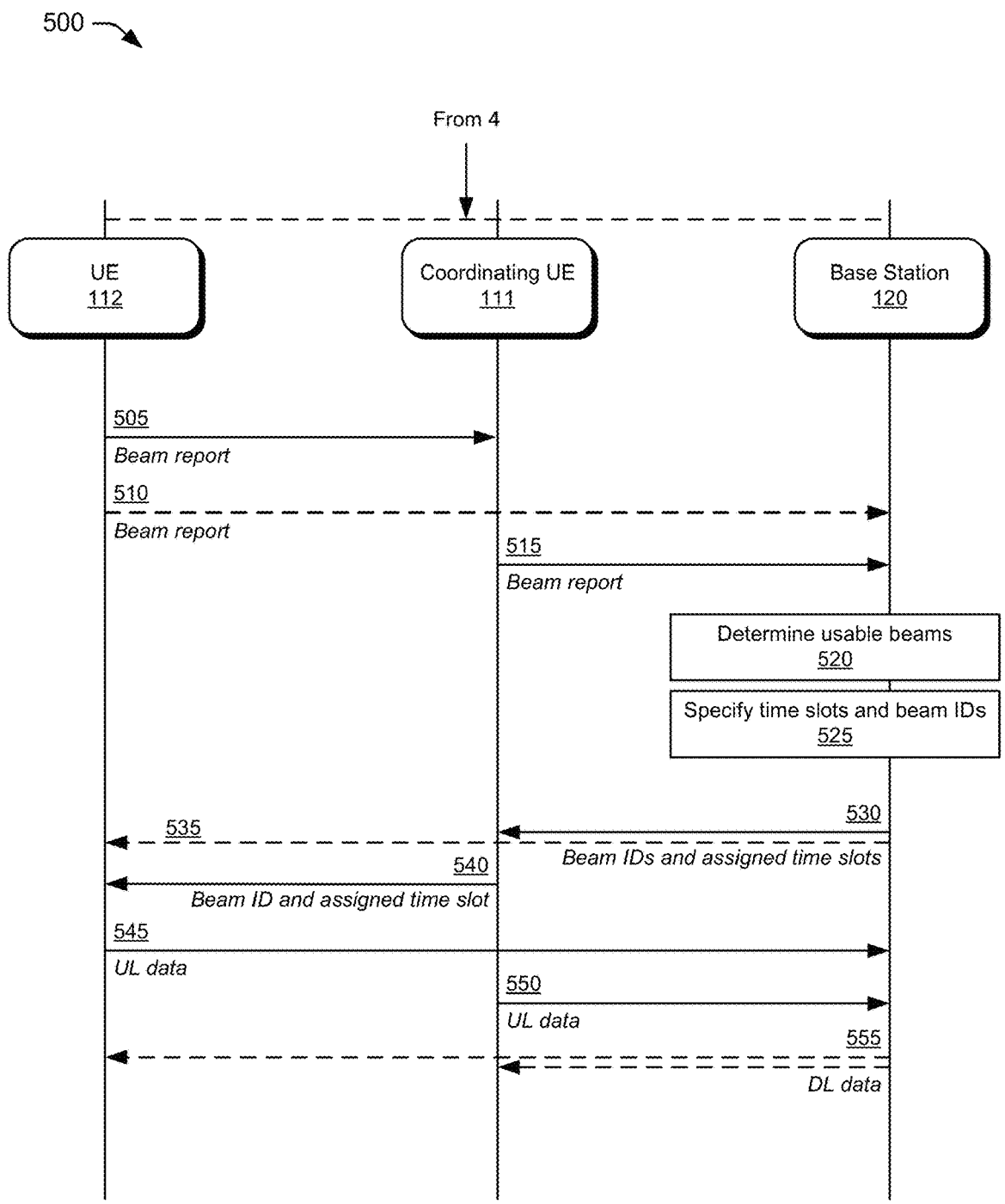
FIG. 5 continues from FIG. 4 and illustrates a procedure for a base station coordinating beam sweeping of the UE-coordination set.
Figure 6:
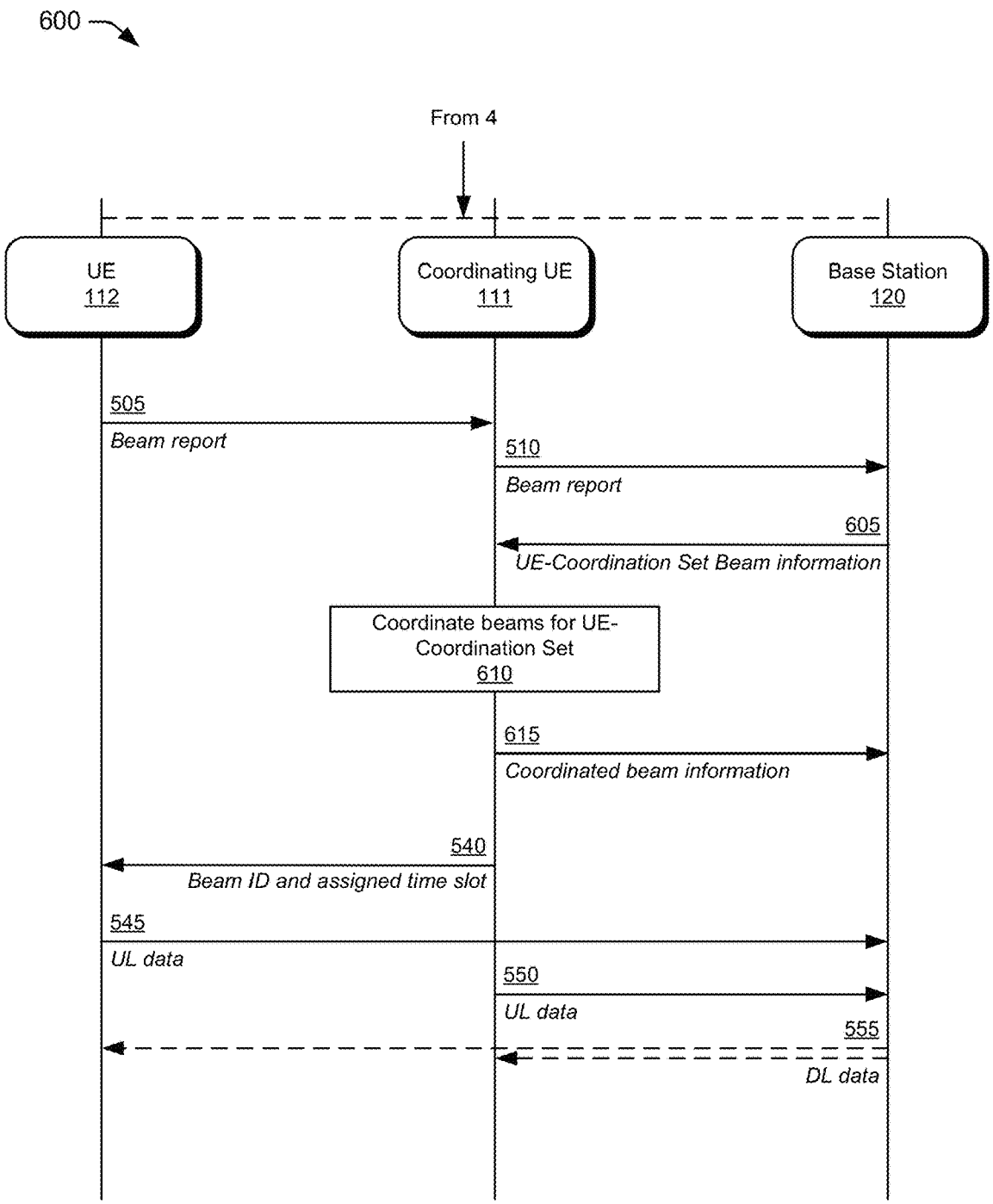
FIG. 6 continues from FIG. 4 and illustrates a procedure for a coordinating UE coordinating beam sweeping of the UE-coordination set.

At this point, the process branches to FIG. 5 or FIG. 6 based on which entity coordinates the beam sweeping of the UE-coordination set 302. FIG. 5 describes beam sweeping coordination by the base station 120. FIG. 6, however, describes beam sweeping coordination by the coordinating UE 111.

Continuing the example process at FIG. 5, the UE 112 (the target UE 112 in this example) and one or more other UEs in the UE-coordination set 302 beam reports, at 505, to the coordinating UE 111. This may be beneficial in instances where the target UE 112 has no usable beam to communicate with the base station 120 due to low signal quality or blocking objects. The coordinating UE 111 receives beam-reporting information from the target UE 112 (and one or more other UEs within the UE-coordination set 302) over the local wireless network connection. The information may include results of the beam-training procedures performed by the UEs. The results may include the precoding matrices for each of the UEs for beamforming the 5G NR communication link with the base station. Alternatively, the UE 112 may beam report, at 510, directly to the base station 120.

The coordinating UE 111 beam reports, at 515, to the base station 120. In aspects, the beam report includes a collection of beam-reporting information from all of the UEs in the UE-coordination set that beam reported to the coordinated UE 111. If, however, the UEs in the UE-coordination set 302 beam reported directly to the base station 120, then the coordinating UE 111 transmits, at 515, only its own beam report.

Based on the beam-reporting information received from the UE-coordination set 302, the base station 120 determines, at 520, usable (or best) beams for communication with the UEs in the UE-coordination set 302. The base station 120 then specifies, at 525, one or more beam IDs and one or more time slots for each UE in the UE-coordination set 302 based on the determination of usable beams to coordinate the beam sweeping of the UE-coordination set 302.

The base station 120 transmits, at 530, beam IDs and assigned time slots to the coordinating UE 111 to coordinate beam sweeping of the UE-coordination set 302 and allow the coordinating UE 111 to distribute the beam IDs and time slots to the other UEs in the UE-coordination set 302. The base station 120 transmits, at 530, the coordinating UE's beam ID and assigned time slot to the coordinating UE 111. In some implementations, as illustrated at 535, the base station separately transmits the target UE's beam ID and assigned time slot directly to the target UE 112. Alternatively, as illustrated at 540, the coordinating UE 111 distributes the beam IDs and assign time slots to the UE(s) 112, where the coordinating UE 111 receives the beam IDs and assign time slots for the UE(s) at 535 (with the coordinating UE's beam ID and assigned time slot).

After the UEs in the UE-coordination set 302 have their respective beam ID and assigned time slot, those UEs can initiate uplink communications (e.g., transmission of the uplink data). For example, the target UE 112 transmits, at 545, the UL data using a first beam corresponding to the target UE's beam ID and assigned time slot, and the coordinating UE 111 transmits, at 550, the uplink data using a second beam corresponding to the coordinating UE's beam ID and assigned time slot. Alternatively, for joint reception of downlink data, the base station 120 transmits, at 555, the downlink data to each UE in the UE-coordination set 302 that has a beam ID and assigned time slot, using beams corresponding to the beam IDs and assigned time slots. Here, the coordinating UE 111 and the target UE 112 each perform downlink communications (e.g., reception of the downlink data).

Returning to the branch in FIG. 4, if the coordinating UE 111 coordinates the beam sweeping for the UE-coordination set 302, then the process continues to FIG. 6. Similar to that described with reference to FIG. 5, the UEs (including the target UE 112) beam report, at 505, to the coordinating UE 111. The coordinating UE 111 beam reports, at 510, to the base station 120 the beam-reporting information from the other UEs in the UE-coordination set 302 (including itself) to enable the base station 120 to determine available time slots. The base station 120 transmits, at 605, UE-coordination set beam information to the coordinating UE 111. This information includes available time slots for communication with the UEs and usable beams for each UE.

The coordinating UE 111 coordinates, at 610, beams for the UE-coordination set 302 by specifying a beam ID and an assigned time slot for each UE within the UE-coordination set 302. In aspects, the coordinating UE 111 determines the beam ID and assigned time slot for each UE based on the information received from the base station 120 that indicates usable beams and available time slots. The beam IDs and time slots direct each UE to use a specific beam at a specified time slot. As described above, at least two UEs can have different assigned time slots and/or at least two UEs can be assigned the same time slot. Further as described above, a beam ID may be unique to an individual UE within the UE-coordination set and/or a beam ID may correspond to two or more UEs within the UE-coordination set that are assigned different time slots.

The coordinating UE 111 can transmit, at 615, coordinated beam information to the base station 120 to inform the base station 120 of the beam IDs and assigned time slots for each UE in the UE-coordination set 302. Similar to that described with reference to FIG. 5, the coordinating UE 111 also transmits, at 540 and over the local wireless network connection, beam IDs and assigned time slots to corresponding UEs (including the target UE 112) within the UE-coordination set to coordinate the joint communication with the base station 120.

After each UE in the UE-coordination set 302 has their respective beam ID and assigned time slot, each UE can initiate the joint transmission of the uplink data. For example, the target UE 112 transmits, at 545, the UL data using a first beam corresponding to the target UE's beam ID and assigned time slot, and the coordinating UE 111 transmits, at 550, the uplink data using a second beam corresponding to the coordinating UE's beam ID and assigned time slot. Alternatively, for joint reception of downlink data, the base station 120 transmits, at 555, the downlink data to each UE in the UE-coordination set 302 that has a beam ID and assigned time slot, using beams corresponding to each beam ID and assigned time slot.

Example Methods

Example methods 700 and 800 are described with reference to FIGS. 7 and 8 in accordance with one or more aspects of user-equipment-coordination set beam sweeping. The order in which the method blocks are described are not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

FIG. 7 illustrates an example method 700 that is in accordance with aspects of user-equipment-coordination set beam sweeping. In implementations, a user equipment performs operations included in the method 700, such as a coordinating UE (e.g., UE 111). as described in various examples with reference to FIGS. 1-6.

At 705, a UE receives an indication to coordinate beam sweeping with a UECS. For example, a coordinating UE (e.g., UE 111) receives an indication from a base station (e.g., the base station 120) to coordinate joint reception of downlink data for a target UE as described at 425 of FIG. 4. In receiving the indication to coordinate joint reception, the coordinating UE implicitly identifies this as an indication to coordinate beam sweeping. Alternatively or additionally, the coordinating UE (e.g., UE 111) receives uplink data from the target UE (e.g., UE 112) for joint transmission as described at 420 of FIG. 4, and identifies this as an implicit indication to coordinate joint transmissions. Thus, the coordinating UE can receive an implicit indication to coordinate beam sweeping by receiving indications to coordinate joint reception and/or to coordinate joint transmission. In implementations, the UE-coordination set includes multiple UEs, including the coordinating UE.

At 710, the UE directs, over a local wireless network connection, each UE in the UECS to perform a beam-training procedure that includes receiving, from the base station, a set of downlink beam transmissions that cover a spatial area according to pre-specified time intervals and directions. To illustrate, the coordinating UE (e.g., UE 111) directs each UE (e.g., UE 112, UE 113) to perform a beam-training procedure as described at 430 of FIG. 4. The beam-training procedure can include each UE receiving the set of downlink beam transmissions or a portion of the downlink transmissions, and generating beam reports on the downlink beam transmissions. Alternatively or additionally, the beam-training procedure can include each UE transmitting one or more uplink beam transmissions, such as one or more sounding reference signals as described with reference to FIG. 3. Thus, in directing each UE to perform the beam-training procedure, the coordinating UE directs each UE to receive (and measure) a set of downlink transmissions and/or generate a set of uplink transmissions.

At 715, the UE forwards, to the base station, beam report information that includes beam quality information based on the beam-training procedure. For instance, the coordinating UE (e.g., UE 111) forwards a first beam report generated by the coordinating UE, such as that described at 515 of FIG. 5. In other words, the coordinating UE generates a coordinating-user-equipment beam report based on at least one downlink beam transmission, and transmits the coordinating-user-equipment beam report to the base station using the wireless network connection. Alternatively or additionally, the coordinating UE forwards beam reports from other UE's, such as that described at 505 of FIG. 5. For instance, the coordinating UE receives at least a second beam report based on the set of downlink beam transmissions from another UE, and transmits the second beam report to the base station over the wireless network connection.

At 720, the UE receives, from the base station and over a wireless network connection, an indication of one or more beam identities and one or more assigned time slots. For example, the coordinating UE (e.g., UE 111) receives the beam identities and/or the assigned time slots as described at 530 of FIG. 5.

At 725, the UE directs at least two UEs in the UECS to use specific beams indicated by the one or more beam identities at specific time slots indicated by the one or more assigned time slots, such as by transmitting, over the local wireless network connection, a respective beam identity of the one or more beam identities and a respective time slot of the one or more assigned time slots to each UE of the at least two UEs. For example, the coordinating UE (e.g., UE 111) directs the at least two UEs (e.g., UE 112) to use specific beams by forwarding beam identities and assigned time slots to each UE over a local wireless network as described at 540 of FIG. 5 and/or FIG. 6. In forwarding the respective beam identity and respective assigned time slot, the coordinating UE directs the UEs to perform joint reception and/or joint transmission, such as that described at 545 and/or at 555 of FIG. 5 and FIG. 6.

FIG. 8 illustrates an example method 800 that is in accordance with aspects of UE-coordination set beam sweeping. In implementations, a base station performs operations included in the method 800, such as the base station (e.g., base station 120) as described in various examples with reference to FIGS. 1-6.

At 805, the base station transmits, to a coordinating UE in a UECS, an indication to coordinate beam sweeping with the UECS. For instance, the base station (e.g., base station 120) transmits the indication to a coordinating UE (e.g., UE 111) as described at 425 of FIG. 4.

At 810, the base station transmits a set of downlink beam transmissions that cover a spatial area according to pre-specified time intervals and directions. For example, the base station (e.g., base station 120) transmits a set of downlink beam transmissions to the coordinating UE (e.g., UE 111) and/or other UEs (e.g., UE 112) in the user-equipment-coordination set as described at 435 and at 440 of FIG. 4.

At 815, the base station receives, from the UECS, beam report information that indicates beam quality information for at least two UEs in the UECS, the beam quality information based on the set of downlink beam transmissions. For example, as described at 515 of FIG. 5, the base station (e.g., base station 120) receives a beam report (e.g., a coordinated-user-equipment beam report) from the coordinating UE (e.g., 111). Alternatively or additionally, the base station (e.g., base station 120) receives a beam report from other UEs (e.g., UE 112) as described at 510 of FIG. 5.

At 820, the base station selects, based on the beam report information, one or more beam identities that specify specific beams to be used by the at least two UEs. For instance, the base station (e.g., base station 120) determines usable beams for the UEs (e.g., UE 111, UE 112) as described at 525 of FIG. 5. Similarly, at 825, the base station selects, based on the beam report information, one or more time slots that specify specific time slots to be used by the at least two UEs. To illustrate, as described at 525 of FIG. 5, the base station (e.g., base station 120) determines time slot(s) for the UEs (e.g., UE 111, UE 112). In some implementations, to determine the time slot(s) and beam identities, the base station receives beamforming capability information of one or more user equipments in the user-equipment-coordination set, such as from the coordinating user equipment, and selecting the time slots and the beam identities based on the beamforming capability information. For example, the base station can select time slots and beam identities that are compatible with the beamforming capabilities of each UE in the user-equipment-coordination set.

The base station determines any combination of time slots and beam identities. For example, the base station sometimes selects a first time slot for a first user equipment in the user-equipment-coordination set and at least a second, different time slot for a second user equipment in the user-equipment-coordination set. In selecting the beam identities, the base station sometimes selects a first beam identity for the first user equipment and at least a second beam identity for the second user equipment, wherein the first beam identity corresponds to a first beam direction and the second beam identity corresponds to a second beam direction. Other times, the base station selects a same beam identity for each user equipment in the user-equipment-coordination set, wherein the same beam identity corresponds to a same beam direction. As another example, the base station selects a same time slot for at least two user equipments in the user-equipment-coordination set and selects different beam identities for the at least two user equipments.

Alternatively or additionally, to determine the time slots and beam identities, the base station receives a set of uplink beam transmissions from at least some user equipments in the user-equipment-coordination set and generates uplink beam measurements for the set of uplink beam transmissions. The base station then determines the one or more time slots and the one or more beam identities based on the uplink beam measurements.

At 830, the base station directs the at least two UEs to use the specific beams at the specific time slots by transmitting an indication of the one or more beam identities and the one or more time slots to the at least two UEs. For example, as described at 530 of FIG. 5, the base station (e.g., base station 120) transmits an indication of beam identities and time slots to the coordinating UE (e.g., UE 111). Alternatively or additionally, the base station (e.g., base station 120) transmits, directly to each UE in the AECS, a respective indication of a respective beam identity of the one or more beam identities and a respective time slot of the one or more time slots as described at 535 of FIG. 5.

Generally, any of the components, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Although techniques and devices for UE-coordination set beam sweeping have been described in language specific to features and/or methods, it is to be understood that the subject of the appended claims is not necessarily limited to the specific features or methods described. Rather, the specific features and methods are disclosed as example implementations enabling UE-coordination set beam sweeping.

In the following, several examples are described:

Example 1: A method performed by a user equipment for beamformed joint communication between a base station and multiple user equipments in a user-equipment-coordination set, the method comprising: receiving an indication to coordinate beam sweeping with the user-equipment-coordination set; in response to receiving the indication to coordinate beam sweeping, directing, over a local wireless network connection, each user equipment in the user-equipment-coordination set to perform a beam-training procedure that includes receiving, from the base station, a set of downlink beam transmissions that cover a spatial area according to pre-specified time intervals and directions; forwarding, to the base station and over a wireless network connection, beam report information that indicates beam quality information based on the beam-training procedure; in response to forwarding the beam report information, receiving, from the base station and over the wireless network connection, an indication of one or more beam identities and one or more assigned time slots; and directing at least two user equipments in the user-equipment-coordination set to use specific beams indicated by the one or more beam identities at specific time slots indicated by the one or more assigned time slots by transmitting, over the local wireless network connection, a respective beam identity of the one or more beam identities and a respective time slot of the one or more assigned time slots to each user equipment of the at least two user equipments.

Example 2: The method as recited in example 1, wherein transmitting the respective beam identity comprises: transmitting a first beam identity to a first user equipment of the at least two user equipments, and at least a second beam identity to a second user equipment of the at least two user equipments, wherein the first beam identity corresponds to a first beam direction and the second beam identity corresponds to a second beam direction; or transmitting a same beam identity to each user equipment of the at least two user equipments, wherein the same beam identity corresponds to a same beam direction.

Example 3: The method as recited in example 1 or example 2, wherein transmitting the respective time slot to each user equipment of the at least two user equipments comprises: transmitting a first assigned time slot to a first user equipment of the at least two user equipments, and transmitting a second, different assigned time slot to a second user equipment of the at least two user equipments; or transmitting a same time slot to each user equipment of the at least two user equipments.

Example 4: The method as recited in any one of examples 1 to 3, wherein forwarding the beam report information to the base station further comprises: selecting, by the user equipment, a beam from the set of downlink beam transmissions; generating, by the user equipment, a first beam report that includes an indication of the selected beam; and transmitting, over the wireless network connection, the first beam report to the base station.

Example 5: The method as recited in example 4, further comprising: receiving, from at least one user equipment in the user-equipment-coordination set, at least a second beam report based on the set of downlink beam transmissions; and transmitting, over the wireless network connection and to the base station, the at least second beam report by: transmitting the second beam report to the base station separately from the first beam report; or including the second beam report in the first beam report transmitted to the base station.

Example 6: The method as recited in any one of examples 1 to 5, where directing each user equipment in the user-equipment-coordination set to perform the beam-training procedure further comprises: directing each user equipment in the user-equipment-coordination set to transmit uplink sounding reference signals in pre-specified time-varying directions that sweep the spatial area.

Example 7: The method as recited in any one of examples 1 to 6, wherein the one or more beam identities and the one or more assigned time slots correspond to one or more beam-pairs, and the method further comprises: receiving, from a target user equipment in the user-equipment-coordination set, a second indication to transmit an uplink communication to the base station; and directing at least a subset of user equipments in the user-equipment-coordination set to transmit the uplink communication to the base station using one or more uplink beams based on the one or more beam-pairs.

Example 8: A method performed by a base station for configuring beamformed joint communication between the base station and multiple user equipments in a user-equipment-coordination set, the method comprising: transmitting, to a coordinating user equipment in the user-equipment-coordination set, an indication to coordinate beam sweeping with the user-equipment-coordination set; transmitting a set of downlink beam transmissions that cover a spatial area according to pre-specified time intervals and directions; receiving, from the user-equipment-coordination set, beam report information that indicates beam quality information for at least two user equipments in the user-equipment-coordination set, the beam quality information based on the set of downlink beam transmissions; selecting, based on the beam report information, one or more beam identities that specify specific beams to be used by the at least two user equipments; selecting, based on the beam report information, one or more time slots that specify specific time slots to be used by the at least two user equipments; and directing the at least two user equipments to use the specific beams at the specific time slots by transmitting an indication of the one or more beam identities and the one or more time slots to the at least two user equipments.

Example 9: The method as recited in example 8, further comprising: receiving, from the coordinating user equipment, beamforming-capability information of one or more user equipments in the user-equipment-coordination set, and wherein selecting the one or more beam identities further comprises: selecting the one or more beam identities based on the beamforming-capability information.

Example 10: The method as recited in example 8 or example 9, wherein selecting the one or more time slots comprises: selecting a first time slot for a first user equipment of the at least two user equipments and at least a second, different time slot for a second user equipment of the at least two user equipments; or selecting a same time slot for the at least two user equipments.

Example 11: The method as recited in example 10, wherein selecting the one or more beam identities comprises: selecting a first beam identity for the first user equipment and at least a second beam identity for the second user equipment, wherein the first beam identity corresponds to a first beam direction and the second beam identity corresponds to a second beam direction; or selecting a same beam identity for the at least two user equipments, wherein the same beam identity corresponds to a same beam direction.

Example 12: The method as recited in any one of examples 8 to 11, wherein selecting the one or more beam identities and selecting the one or more time slots further comprise: receiving a set of uplink beam transmissions from at least some user equipments in the user-equipment-coordination set; generating uplink beam measurements for the set of uplink beam transmissions; and selecting the one or more beam identities and the one or more time slots based on the uplink beam measurements.

Example 13: The method as recited in any one of examples 8 to 12, wherein directing the at least two user equipments to use the specific beams at the specific time slots further comprises: transmitting a respective beam identity of the one or more beam identities, and a respective time slot of the one or more time slots, directly to each user equipment of the at least two user equipments; or transmitting the indication of the selected one or more beam identities and the one or more time slots to the coordinating user equipment for distribution to the at least two user equipments.

Example 14: A user equipment apparatus comprising: at least one wireless transceiver; a processor; and computer-readable storage media comprising instructions, responsive to execution by the processor, for directing the user equipment apparatus to perform any one of the methods recited in examples 1 to 7 using the at least one wireless transceiver.

Example 15: A base station apparatus comprising: at least one wireless transceiver; a processor; and computer-readable storage media comprising instructions, responsive to execution by the processor, for directing the base station apparatus to perform any one of the methods recited in examples 8 to 13 using the at least one wireless transceiver.

Example 16: A method performed by a user equipment for beamformed joint communications, between a base station and multiple user equipments in a user-equipment-coordination set, the method comprising: receiving, over a local wireless network connection and from a coordinating user equipment of the user-equipment-coordination set, a message directing the user equipment to perform a beam-training procedure comprising: generating at least one uplink beam transmission according to a pre-specified time slot and direction; or generating a beam report on at least one downlink beam transmission and transmitting the beam report to the coordinating user equipment or the base station; receiving a beam identity and an assigned time slot corresponding to a specific beam; and participating in the joint communications using the specific beam by: transmitting, to the base station and using the specific beam, uplink communications for a target user equipment in the user-equipment-coordination set; or receiving, from the base station and using the specific beam, downlink communications for the target user equipment.

Example 17: The method as recited in example 16, wherein participating in the joint communications further comprises: receiving uplink data from the coordinating user equipment over the local wireless network connection; and transmitting the uplink data using the specific beam.

Example 18: The method as recited in example 16, wherein participating in the joint communications further comprises: receiving, from the base station, downlink signals using the specific beam; and transmitting, using the local wireless network connection, the downlink signals to the coordinating user equipment.

Example 19: The method as recited in any one of examples 16 to 18, wherein the beam-training procedure further comprises: transmitting the beam report to the coordinating user equipment using the local wireless network connection; or transmitting the beam report to the base station using a wireless network connection.

Example 20: The method as recited in any one of examples 8 to 12, further comprising: receiving, directly from at least a second user equipment in the user-equipment-coordination set, beamforming-capability information of at least the second user equipment, and wherein selecting the one or more beam identities and selecting the one or more time slots further comprise: selecting the one or more beam identities and the one or more time slots based on the beamforming-capability information of the second user equipment.

Example 21: A method performed by a user equipment for coordinating joint communications, between a base station and multiple user equipments in a user-equipment-coordination set, the method comprising: receiving an indication to coordinate beam sweeping with the user-equipment-coordination set; in response to receiving the indication to coordinate beam sweeping, directing, over a local wireless network connection, each user equipment in the user-equipment-coordination set to perform a beam-training procedure that includes receiving, from the base station, a set of downlink beam transmissions that cover a spatial area according to pre-specified time intervals and directions; forwarding, to the base station and over a wireless network connection, beam report information based on the beam-training procedure; in response to forwarding the beam report information, receiving, from the base station and over the wireless network connection, user-equipment-coordination set beam information; selecting, based on the user-equipment-coordination set beam information, one or more beam identities and one or more time slots that specify one or more specific beams; and transmitting, over the local wireless network connection, a respective beam identity of the one or more beam identities and a respective time slot of the one or more time slots to at least one user equipment of the user-equipment-coordination set.

Example 22: The method as recited in example 21, further comprising: forwarding the selected one or more beam identities and the selected one or more time slots to the base station.

Example 23: The method as recited in example 21 or example 22, further comprising: directing each user equipment in the user-equipment-coordination set to transmit a set of uplink beam transmissions that cover the spatial area according to the pre-specified time intervals and directions as part of the beam-training procedure.

Example 24: A method performed by a base station for coordinating joint communications between the base station and multiple user equipments in a user-equipment-coordination set, the method comprising: indicating, to a coordinating user equipment in the user-equipment-coordination set, to coordinate beam sweeping with the user-equipment-coordination set; transmitting a set of downlink beam transmissions that cover a spatial area according to pre-specified time intervals and directions; receiving, from one or more user equipments in the user-equipment-coordination set, beam report information based on the set of downlink beam transmissions; analyzing the beam report information to identify one or more possible beam identities and one or more possible time slots that define possible specific beams for the joint communications; forwarding a first indication of the one or more possible beam identities and the one or more possible time slots to the coordinating user equipment; receiving, from the coordinating user equipment, a second indication of one or more selected beam identities and one or more selected time slots for the joint communications; and processing the joint communications using one or more beams specified by the one or more selected beam identities and the one or more selected time slots by: transmitting, using the one or more beams, downlink communications for a target user equipment in the user-equipment-coordination set; or receiving, using the one or more beams, uplink communications from the target user equipment.

Example 25: The method as recited in example 3, wherein transmitting the respective beam identity and the respective time slot further comprises: directing the first user equipment to jointly receive downlink communications using a first specific beam identified by the first beam identity and at a first specific time slot identified by the first assigned time slot; and directing the second user equipment to jointly receive the downlink communications using a second specific beam identified by the second beam identity and at second specific time slot identified by the second assigned time slot.

Example 26: A computer-readable medium comprising instructions that, responsive to execution by a processor, cause a method as recited in any one of examples 1 to 12 or examples 16 to 25 to be performed.

The invention claimed is:

1. A method performed by a user equipment for beamformed joint communication between a base station and multiple user equipments in a user-equipment-coordination set, the method comprising:
   receiving an indication to coordinate beam sweeping with the user-equipment-coordination set;
   in response to receiving the indication to coordinate beam sweeping, directing, over a local wireless network connection, each user equipment in the user-equipment-coordination set to perform a beam-training procedure that includes receiving, from the base station, a set of downlink beam transmissions that cover a spatial area according to pre-specified time intervals and directions;
   forwarding, to the base station and over a wireless network connection, beam report information that indicates beam quality information based on the beam-training procedure;
   in response to forwarding the beam report information, receiving, from the base station and over the wireless network connection, an indication of one or more beam identities and one or more assigned time slots; and
   directing at least two user equipments in the user-equipment-coordination set to use specific beams indicated by the one or more beam identities at specific time slots indicated by the one or more assigned time slots by transmitting, over the local wireless network connection, a respective beam identity of the one or more beam identities and a respective time slot of the one or more assigned time slots to each user equipment of the at least two user equipments.

2. The method as recited in claim 1, wherein forwarding the beam report information to the base station further comprises:
   selecting, by the user equipment, a beam from the set of downlink beam transmissions;
   generating, by the user equipment, a first beam report that includes an indication of the selected beam; and
   transmitting, over the wireless network connection, the first beam report to the base station.

3. The method as recited in claim 2, further comprising:
   receiving, from at least one user equipment in the user-equipment-coordination set, at least a second beam report based on the set of downlink beam transmissions; and
   transmitting, over the wireless network connection and to the base station, the at least second beam report by:
      transmitting the second beam report to the base station separately from the first beam report; or
      including the second beam report in the first beam report transmitted to the base station.

4. The method as recited in claim 1, wherein transmitting the respective beam identity further comprises:
   transmitting a first beam identity to a first user equipment of the at least two user equipments, and at least a second beam identity to a second user equipment of the at least two user equipments, wherein the first beam identity corresponds to a first beam direction and the second beam identity corresponds to a second beam direction; or
   transmitting a same beam identity to each user equipment of the at least two user equipments, wherein the same beam identity corresponds to a same beam direction.

5. The method as recited in claim 1, wherein transmitting the respective time slot to each user equipment of the at least two user equipments further comprises:

transmitting a first assigned time slot to a first user equipment of the at least two user equipments, and transmitting a second, different assigned time slot to a second user equipment of the at least two user equipments; or transmitting a same time slot to each user equipment of the at least two user equipments.

6. The method as recited in claim 1, wherein directing each user equipment in the user-equipment-coordination set to perform the beam-training procedure further comprises:
directing each user equipment in the user-equipment-coordination set to transmit uplink sounding reference signals in pre-specified time-varying directions that sweep the spatial area.

7. The method as recited in claim 1, wherein the one or more beam identities and the one or more assigned time slots correspond to one or more beam-pairs, and the method further comprises:
receiving, from a target user equipment in the user-equipment-coordination set, a second indication to transmit an uplink communication to the base station; and
directing at least a subset of user equipments in the user-equipment-coordination set to transmit the uplink communication to the base station using one or more uplink beams based on the one or more beam-pairs.

8. A method performed by a base station for configuring beamformed joint communication between the base station and multiple user equipments in a user-equipment-coordination set, the method comprising:
transmitting, to a coordinating user equipment in the user-equipment-coordination set, an indication to coordinate beam sweeping with the user-equipment-coordination set;
transmitting a set of downlink beam transmissions that cover a spatial area according to pre-specified time intervals and directions;
receiving, from the user-equipment-coordination set, beam report information that indicates beam quality information for at least two user equipments in the user-equipment-coordination set, the beam quality information based on the set of downlink beam transmissions;
selecting, based on the beam report information, one or more beam identities that specify specific beams to be used by the at least two user equipments;
selecting, based on the beam report information, one or more time slots to be used by the at least two user equipments; and
directing the at least two user equipments to use specific beams indicated by the one or more beam identities at specific time slots indicated by the one or more time slots by transmitting an indication of the one or more beam identities and the one or more time slots to the at least two user equipments.

9. The method as recited in claim 8, wherein receiving the beam report information further comprises:
receiving, from the coordinating user equipment, a combined beam report that includes respective beam quality information generated by each user equipment of the at least two user equipments in the user-equipment-coordination set; or
receiving, directly from each user equipment the at least two user equipments in the user-equipment-coordination set, a respective beam report that includes the respective beam quality information generated by the user equipment.

10. The method as recited in claim 8, wherein selecting the one or more time slots comprises:
selecting a first time slot for a first user equipment of the at least two user equipments and at least a second, different time slot for a second user equipment of the at least two user equipments; or
selecting a same time slot for the at least two user equipments.

11. The method as recited in claim 10, wherein selecting the one or more beam identities comprises:
selecting a first beam identity for the first user equipment and at least a second beam identity for the second user equipment, wherein the first beam identity corresponds to a first beam direction and the second beam identity corresponds to a second beam direction; or
selecting a same beam identity for the at least two user equipments, wherein the same beam identity corresponds to a same beam direction.

12. The method as recited in claim 8, wherein selecting the one or more beam identities and selecting the one or more time slots further comprises:
receiving a set of uplink beam transmissions from at least some user equipments in the user-equipment-coordination set;
generating uplink beam measurements for the set of uplink beam transmissions; and
selecting the one or more beam identities and the one or more time slots based on the uplink beam measurements.

13. The method as recited in claim 8, wherein directing the at least two user equipments to use the specific beams at the specific time slots further comprises:
transmitting a respective beam identity of the one or more beam identities, and a respective time slot of the one or more time slots, directly to each user equipment of the at least two user equipments; or
transmitting the indication of the selected one or more beam identities and the one or more time slots to the coordinating user equipment for distribution to the at least two user equipments.

14. A user equipment apparatus comprising:
at least one wireless transceiver;
a processor; and
computer-readable storage media comprising instructions, responsive to execution by the processor, for directing the user equipment apparatus to perform operations comprising:
receiving an indication to coordinate beam sweeping with a user-equipment-coordination set;
in response to receiving the indication to coordinate beam sweeping, directing, over a local wireless network connection, each user equipment in the user-equipment-coordination set to perform a beam-training procedure that includes receiving, from a base station, a set of downlink beam transmissions that cover a spatial area according to pre-specified time intervals and directions;
forwarding, to the base station and over a wireless network connection, beam report information that indicates beam quality information based on the beam-training procedure;
in response to forwarding the beam report information, receiving, from the base station and over the wireless network connection, an indication of one or more beam identities and one or more assigned time slots; and directing at least two user equipments in the user-equipment-coordination set to use specific beams indicated by the one or more beam identities at specific time slots indicated by the one or more assigned time slots by transmitting, over the local wireless network connection, a respective beam identity of the one or more beam identities and a respective time slot of the one or more assigned time slots to each user equipment of the at least two user equipments.

15. The user equipment apparatus as recited in claim 14, wherein the computer-readable storage media comprising further instructions that direct the user equipment apparatus to forward the beam report information to the base station by:
selecting a beam from the set of downlink beam transmissions;
generating a first beam report that includes an indication of the selected beam; and
transmitting, over the wireless network connection, the first beam report to the base station.

16. The user equipment apparatus as recited in claim 15, wherein the computer-readable storage media comprising further instructions that direct the user equipment apparatus to perform operations comprising:
receiving, from at least one user equipment in the user-equipment-coordination set, at least a second beam report based on the set of downlink beam transmissions; and
transmitting, over the wireless network connection and to the base station, the at least second beam report by:
transmitting the second beam report to the base station separately from the first beam report; or
including the second beam report in the first beam report transmitted to the base station.

17. The user equipment apparatus as recited in claim 14, wherein the computer-readable storage media comprising further instructions that direct the user equipment apparatus to transmit the respective beam identity by:
transmitting a first beam identity to a first user equipment of the at least two user equipments, and at least a second beam identity to a second user equipment of the at least two user equipments, wherein the first beam identity corresponds to a first beam direction and the second beam identity corresponds to a second beam direction; or
transmitting a same beam identity to each user equipment of the at least two user equipments, wherein the same beam identity corresponds to a same beam direction.

18. The user equipment apparatus as recited in claim 14, wherein the computer-readable storage media comprising further instructions that direct the user equipment apparatus to transmit the respective time slot to each user equipment of the at least two user equipments by:
transmitting a first assigned time slot to a first user equipment of the at least two user equipments, and transmitting a second, different assigned time slot to a second user equipment of the at least two user equipments; or
transmitting a same time slot to each user equipment of the at least two user equipments.

19. The user equipment apparatus as recited in claim 14, wherein the computer-readable storage media comprising further instructions that direct the user equipment apparatus to direct each user equipment in the user-equipment-coordination set to perform the beam-training procedure by:
directing each user equipment in the user-equipment-coordination set to transmit uplink sounding reference signals in pre-specified time-varying directions that sweep the spatial area.

20. The user equipment apparatus as recited in claim 14, wherein the one or more beam identities and the one or more assigned time slots correspond to one or more beam-pairs, and the computer-readable storage media comprising further instructions that direct the user equipment apparatus to perform operations comprising:
receiving, from a target user equipment in the user-equipment-coordination set, a second indication to transmit an uplink communication to the base station; and
directing at least a subset of user equipments in the user-equipment-coordination set to transmit the uplink communication to the base station using one or more uplink beams based on the one or more beam-pairs.

* * * * *